(12) United States Patent  (10) Patent No.: US 11,803,302 B2
Lee et al.  (45) Date of Patent: Oct. 31, 2023

(54) USER INTERFACE DEVICE AND METHOD BASED ON PROACTIVE AND REACTIVE INPUT QUANTIFICATION

(71) Applicant: UIF (University Industry Foundation), Yonsei University, Seoul (KR)

(72) Inventors: Byungjoo Lee, Seoul (KR); Hyunchul Kim, Daejeon (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 28 days.

(21) Appl. No.: 17/564,971

(22) Filed: Dec. 29, 2021

(65) Prior Publication Data

US 2023/0195307 A1   Jun. 22, 2023

(30) Foreign Application Priority Data

Dec. 13, 2021 (KR) .................. 10-2021-0177277

(51) Int. Cl.
*G06F 3/0489* (2022.01)
*G06F 3/04886* (2022.01)
*G06F 3/0481* (2022.01)
*G06F 3/04842* (2022.01)

(52) U.S. Cl.
CPC ........ *G06F 3/04897* (2013.01); *G06F 3/0481* (2013.01); *G06F 3/04842* (2013.01); *G06F 3/04886* (2013.01)

(58) Field of Classification Search
None
See application file for complete search history.

(56) References Cited

U.S. PATENT DOCUMENTS

| 2004/0172630 | A1* | 9/2004 | Seki ........................ | H04L 67/62 718/100 |
| 2005/0177403 | A1* | 8/2005 | Johnson ............... | G06Q 20/201 705/20 |
| 2009/0234501 | A1* | 9/2009 | Ishizaki ................. | B25J 9/1697 700/259 |
| 2012/0069896 | A1* | 3/2012 | Yang .................... | H04N 19/107 375/240.03 |

(Continued)

FOREIGN PATENT DOCUMENTS

| KR | 10-2021-0002713 A | 1/2021 |
| WO | WO 2019/217019 A1 | 11/2019 |

*Primary Examiner* — Patrick N Edouard
*Assistant Examiner* — Peijie Shen
(74) *Attorney, Agent, or Firm* — Paratus Law Group, PLLC

(57) ABSTRACT

A user interface device based on proactive and reactive input quantification, includes a data acquisition unit configured to record input and screen output of a user, an input filtering unit for extracting an input timing for the input of the user, an output filtering unit for extracting an output timing to start a visual change beyond a specific reference for the screen output, an input/output interval extraction unit for generating a distribution of input/output intervals through timings for the input and the screen output of the user, and a model fitting unit for estimating proactiveness and reactiveness by adjusting the distribution of the input/output intervals to a proactive distribution and a reactive distribution.

15 Claims, 12 Drawing Sheets

(56) References Cited

U.S. PATENT DOCUMENTS

| | | | |
|---|---|---|---|
| 2012/0116787 A1* | 5/2012 | Crites | G06Q 30/02 705/1.1 |
| 2014/0160136 A1* | 6/2014 | Kaburlasos | G09G 5/00 345/520 |
| 2014/0199253 A1* | 7/2014 | Hindley | A61Q 5/12 424/70.1 |
| 2014/0336539 A1* | 11/2014 | Torres | A61B 5/162 600/595 |
| 2015/0120933 A1* | 4/2015 | Yates | H04L 47/70 709/226 |
| 2016/0180811 A1* | 6/2016 | Colenbrander | G09G 5/10 356/402 |
| 2016/0246785 A1* | 8/2016 | Sun | G06F 16/278 |
| 2016/0278682 A1* | 9/2016 | Khaligh-Razavi | A61B 5/4082 |
| 2017/0351958 A1* | 12/2017 | Ghosh | G06N 5/04 |
| 2018/0018071 A1* | 1/2018 | Chabrier | G06F 3/04842 |
| 2018/0039440 A1* | 2/2018 | Kanemasa | G06F 11/3419 |
| 2018/0052755 A1* | 2/2018 | Suzuki | G06F 11/328 |
| 2018/0091768 A1* | 3/2018 | Adsumilli | H04N 7/0137 |
| 2018/0180601 A1* | 6/2018 | Pedersen | G01N 33/56977 |
| 2018/0182080 A1* | 6/2018 | Humphrey | G09G 5/10 |
| 2019/0050399 A1* | 2/2019 | Cameron | G06F 16/34 |
| 2019/0164563 A1* | 5/2019 | Volcker | G10L 25/60 |
| 2019/0196686 A1* | 6/2019 | Stulken | G06F 3/1454 |
| 2021/0086089 A1* | 3/2021 | Pardeshi | G06N 3/02 |
| 2021/0252394 A1* | 8/2021 | Hwang | A63F 13/335 |
| 2021/0325406 A1* | 10/2021 | Huang | G01N 33/6872 |
| 2021/0342622 A1* | 11/2021 | Skarda | G06V 30/19013 |
| 2022/0035710 A1* | 2/2022 | Jindal | G06F 11/004 |
| 2023/0030505 A1* | 2/2023 | Prasad | G06F 3/0416 |

* cited by examiner

USER INTERFACE DEVICE AND METHOD BASED ON PROACTIVE AND REACTIVE INPUT QUANTIFICATION

ACKNOWLEDGEMENT

The present patent application has been filed as a research project as described below.
  [National Research Development Project supporting the Present Invention]
  [Project Serial No.] 1711126082
  [Project No.] 2020-0-01361-002
  [Department] Ministry of Science and ICT
  [Project management (Professional) Institute] Institute of Information & Communication Technology Planning & Evaluation
  [Research Project Name] Information & Communication Broadcasting Innovation Talent Cultivation (R&D)
  [Research Task Name] Artificial Intelligence Graduate School Support (Yonsei University) [Contribution Ratio] 1/3
  [Project Performing Institute] Yonsei University Industry Foundation
  [Research Period] 2021 Jan. 1~2021 Dec. 31
  [National Research Development Project supporting the Present Invention]
  [Project Serial No.] 1375027292
  [Project No.] R2021040105-0001
  [Department] Ministry of Culture, Sports and Tourism
  [Project management (Professional) Institute] Korea Creative Content Agency
  [Research Project Name] Cultural Technology (R&D)
  [Research Task Name] Game Now: Artificial Intelligence-based Real-time Game Analysis Technology Development for e-Sports Service
  [Contribution Ratio] 1/3
  [Project Performing Institute] Electronics and Telecommunications Research Institute
  [Research Period] 2021 Jun. 1~2021 Dec. 31
  [National Research Development Project supporting the Present Invention]
  [Project Serial No.] 1375027277
  [Project No.] R2019020010-0003
  [Department] Ministry of Culture, Sports and Tourism
  [Project management (Professional) Institute] Korea Creative Content Agency
  [Research Project Name] Cultural Technology (R&D)
  [Research Task Name] Development of Senior Game Play Support Technology and Game Service Model
  [Contribution Ratio] 1/3
  [Project Performing Institute] Yonsei University Industry Foundation
  [Research Period] 2021 Jan. 1~2021 Dec. 31

CROSS-REFERENCE TO RELATED APPLICATION

This application claims priority to Korean Patent Application No. 10-2021-0177277 (filed on Dec. 13, 2021), which is hereby incorporated by reference in its entirety.

BACKGROUND

The present disclosure relates to a user interface technique, and more particularly, a user interface device and method based on proactive and reactive input quantification capable of quantifying how reactive or proactive a user's input behavior is by analyzing computer screen video and user's input log data.

Human-computer interaction (HCI) refers to an interaction between a human (user) and a computer, where the interaction refers to an operation expressed in a user interface between the user and the computer.

In day-to-day interactions, numerous outputs from the computer are presented to the user, and the user also generates several button inputs. In this process, the user follows one of two strategies: either reacting to the computer's output or taking an active action in anticipation of the computer's output. In the case where a degree of the user's dependence on the response or the prior button input strategy is statistically quantified as a user reaction and a user proactive response, respectively, the quantification of the reactiveness may indicate the effectiveness of the interaction technique. Changes in reactiveness over time serve to indicate habit formation and learning. Likewise, proactiveness refers to general predictability and consistency. Changes in initiative over time indicate habit formation and learning. Quantitative methods of analysis for these two constructs do not exist, but are relevant to many questions in HCI. For example, an interaction designer may wonder if animated transitions actually help users plan and execute future inputs. Moreover, game designers may wonder how visual design of a game affects a player's performance.

PRIOR ART LITERATURE

Patent Literature (Patent Document 1) Korean Patent Laid-Open Publication No. 10-2021-0002713 (Jan. 8, 2021)

SUMMARY

One embodiment of the present disclosure provides a user interface device and method based on proactive and reactive input quantification capable of quantifying how reactive or proactive a user's input behavior is by analyzing computer screen video and user's input log data.

According to an aspect of the present disclosure, there is provided a user interface device based on proactive and reactive input quantification, the user interface device including: a data acquisition unit configured to record input and screen output of a user; an input filtering unit configured to extract an input timing for the input of the user; an output filtering unit configured to extract an output timing to start a visual change beyond a specific reference for the screen output; an input/output interval extraction unit configured to generate a distribution of input/output intervals through timings for the input and the screen output of the user; and a model fitting unit configured to estimate proactiveness and reactiveness by adjusting the distribution of the input/output intervals to a proactive distribution and a reactive distribution.

The data acquisition unit may record time series input actions of the user for each input entity for a specific section and records a time series output of the screen for each frame image.

The input filtering unit extracts a discrete timing of the input of the user based on generation of an input event.

The output filtering unit may extract the output timing based on the screen output through (1) a visual change on the screen triggered by the input of the user, (2) a visual change on the screen that triggers the reactive input of the user, (3)

a visual change on the screen that triggers the proactive input of the user, and (4) a visual change on the screen completely independent of the input of the user.

The output filtering unit may downscale a resolution or a frame rate of a frame image for recording the screen output before extraction of the output timing.

The output filtering unit may set a factor of the downscale based on an average interval for the input of the user.

The output filtering unit sets a specific criterion based on a user visual perception of a difference between frame images constituting the screen output.

The input/output interval extraction unit may calculate a difference between timings for the input of the user and the screen output and generate a distribution including a plurality of bars based on the difference.

The input/output interval extraction unit may remove the most frequent bar existing in a negative region of the distribution.

The model fitting unit may calculate the proactiveness by generating the distribution of the input/output interval as a Gaussian distribution, and calculate the reactiveness by generating the distribution of the input/output interval as a reactive distribution including an X-Gaussian distribution.

The model fitting unit may adjust characteristics of a user interface based on the proactiveness and the reactiveness.

The model fitting unit may control a visual layout and an operational function of the user interface.

According to another aspect of the present disclosure, there is provided a user interface method based on proactive and reactive input quantification, the user interface method including: a data acquisition step of recording input and screen output of a user; an input filtering step of extracting an input timing for the input of the user; an output filtering step of extracting an output timing to start a visual change beyond a specific reference for the screen output; an input/output interval extracting step of generating a distribution of input/output intervals through timings for the input and the screen output of the user; and a model fitting step of estimating proactiveness and reactiveness by adjusting the distribution of the input/output intervals to a proactive distribution and a reactive distribution.

In the data acquisition step, for a specific section, time series input actions of the user may be recorded for each input entity and time series output of the screen may be recorded for each frame image.

In the input filtering step, the input of the user may extract a discrete timing based on generation of an input event.

In the output filtering step, a resolution or a frame rate of a frame image for recording the screen output may be downscaled before extraction of the output timing.

The disclosed technique may have the following effects. However, this does not mean that a specific embodiment should include all of the following effects or only the following effects, and thus, a scope of the disclosed technique should not be understood as being limited thereby.

According to a user interface device and method based on proactive and reactive input quantification of the present disclosure, it is possible to measure a time internal distribution between input timings of a user and visual change on the screen, estimate how the distribution can be constructed as the sum of a reactive distribution, a predictive distribution, and an irrelevant distribution to find out how reactive or proactive the input of the user is, and find out how the input of the user is measured for a specific location on a screen.

DETAILED DESCRIPTION

Figure 1:
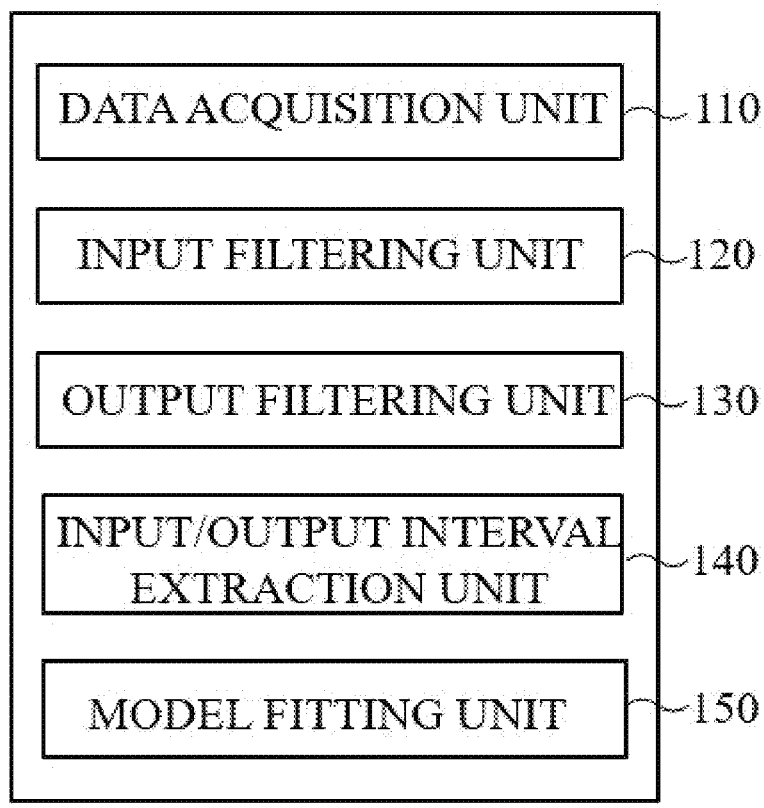
FIG. 1 is a diagram for illustrating a physical configuration of a user interface device according to the present disclosure.

A sample Since the description of the present disclosure is merely an embodiment for structural or functional description, a scope of the present disclosure should not be construed as being limited by embodiments described in the text. That is, since the embodiments may have various changes and may have various forms, it should be understood that the scope of the present disclosure includes equivalents capable of realizing the technical idea. In addition, since objects or effects presented in the present disclosure do not mean that a specific embodiment should include all of them or only such effects, it should not be understood that the scope of the present disclosure is limited thereby.

Meanwhile, meanings of terms described in the present application should be understood as follows.

Terms such as "first" and "second" are for distinguishing one component from another, and the scope of rights should not be limited by these terms. For example, a first component may be termed a second component, and similarly, a second component may also be termed a first component.

When a component is referred to as being "connected to" another component, the component may be directly connected to another component, but it should be understood that other components may exist in between. Meanwhile, when it is mentioned that a certain component is "directly connected" to another component, it should be understood that other components does not exist therebetween. Moreover, other expressions describing a relationship between components, that is, "between" and "immediately between" or "neighboring to" and "directly adjacent to", or the like should be interpreted similarly.

The singular expression is to be understood as including the plural expression unless the context clearly dictates otherwise, terms such as "comprise" or "have" are intended to designate the existence of an embodied feature, number, step, action, component, part, or combination thereof, and it should be understood that it does not preclude the possibility of addition or existence of one or more other features, numbers, steps, actions, components, parts, or combinations thereof.

In each step, identification numbers (for example, a, b, c, or the like) are used for convenience of description, identification numbers do not describe the order of each step, and each step may occur in a different order than the stated order unless the context clearly dictates a specific order. That is, each step may occur in the same order as specified, may be performed substantially simultaneously, or may be performed in the reverse order.

The present disclosure can be embodied as computer-readable codes on a computer-readable recording medium, and the computer-readable recording medium includes all types of recording devices in which data readable by a computer system is stored. Examples of the computer-readable recording medium include ROM, RAM, CD-ROM, magnetic tape, floppy disk, optical data storage device, and the like. In addition, the computer-readable recording medium is distributed in a computer system connected to a network, and thus, the computer-readable code can be stored and executed in a distributed manner.

All terms used herein have the same meaning as commonly understood by one of ordinary skill in the art to which the present disclosure belongs, unless otherwise defined. Terms defined in general used in the dictionary should be interpreted as having the meaning consistent with the context of the related art, and cannot be interpreted as having an ideal or excessively formal meaning unless explicitly defined in the present application.

The present disclosure can be carried out in five steps. A first step is data collection, which records an input log of a user and a computer screen. A second step is to extract a button input timing intended by the user from the input log given by input filtering. A third step is output filtering, which identifies a visual change perceptible to the user for each frame of recorded screen video. A fourth step is IOI extraction to obtain an IOI distribution from the button input and output pairs. A last step is model fitting to estimate reactiveness and proactiveness by fitting a posterior distribution and a prior distribution to the obtained IOI distribution.

FIG. 1 is a diagram for illustrating a physical configuration of a user interface device according to the present disclosure.

Referring to FIG. 1, a user interface device 100 may include a data acquisition unit 110, an input filtering unit 120, an output filtering unit 130, an input/output interval extraction unit 140, a model fitting unit 150, and a control unit (not shown in FIG. 1).

The data acquisition unit 110 may record an input of a user and a screen output. The data acquisition unit 110 may record time series input actions of the user for each input entity for a specific section and record the time series output of the screen for each frame image. Here, the input entity may correspond to a button.

In an embodiment, the data acquisition unit 110 may record the input of the user and the screen output for a specific period T. The recorded input action is a time series of a button input $b^{type}$ (1 when pressed, 0 when not pressed) and cursor coordinates x and y (a unit of pixel when available). When the user presses different buttons, data can be recorded separately for each button. For example, it may be recorded as $b^{ml}$ for a left mouse button and $b^a$ for a key "a". A logged output of a computer may be all frame images v (here, 24-bit RGB) presented to the user on a visual display during a logging period. A pixel resolution of the frame image v may vary depending on a target application and hardware.

When a frame rate of input logging is f and the number of logged frames N is f·T, the final logging data can be expressed by Equation 1 below.

$$b^{type}=[b_1^{type},b_2^{type},\ldots,b_N^{type}]$$

$$x=[x_1,x_2,\ldots,x_N]$$

$$y=[y_1,y_2,\ldots,y_N]$$

$$v=[v_1,v_2,\ldots,v_N]$$

$$t=[1/f,2/f,\ldots,T] \quad \text{[Equation 1]}$$

Here, t is a timestamp.

In the present embodiment, the screen image is recorded using open broadcaster software (OBS) (f=60 Hz), and the button input and the cursor coordinates are recorded together at the moment the OBS callback function is executed using a pyuput library. The entire script is implemented in Python, the video is recorded in mp4 format, and button input and cursor coordinates are recorded in a csv format. When recording is executed for 30 minutes at a general resolution, that is, 1680×1050, raw data file will be about 3 GB.

The input filtering unit 120 may extract an input timing for the input of the user. The input filtering unit 120 may extract a discrete timing based on generation of all input events generated by the user. Here, the generation of the input event may include an action executed by clicking on a specific icon, and may exclude that no input event has occurred by clicking an empty space.

In an embodiment, the input filtering unit 120 may extract an individual timing at which the user intends to generate a button input event from input log data of a specific type of button $b^{type}$. It takes about tens of ms from the moment the user presses the button to the moment the user releases his/her hand, and during this period, there is a moment closest to an intended input timing of the user. Here, it may be assumed that the moment when a button input log changes from 0 to 1, that is, the moment the button starts to be pressed, is the button input activation moment intended by the user. That is, the button input timing intended by the user may be determined as in Equation 2 below.

$$\text{Find all } i \text{ where, } (b_i^{type}-b_{i-1}^{type})=1 \quad \text{[Equation 2]}$$

As a result, a timestamp of the input timing intended by the user using a specific type of button $b^{type}$ may be defined as in Equation 3 below.

$$t_{input}^{type}=[t_1^{type},t_2^{type},\ldots,t_{B^{type}}^{type}] \quad \text{[Equation 3]}$$

Here, $t_{input}^{type}$ is the input timing intended by the user using the specific type of button, and $B^{type}$ is the number of input events detected by the corresponding button.

The output filtering unit 130 may extract an output timing of initiating a visual change greater than or equal to a specific reference for the screen output. The output filtering unit 130 may extract the output timing based on a screen output through a visual change on the screen triggered by the input of the user, a visual change on the screen that triggers a reactive input of the user, a visual change on the screen that triggers a proactive input of a user, and a visual change on the screen completely irrelevant to the input of the user. The output filtering unit 130 may downscale a resolution or a frame rate of a frame image for recording the screen output before the output timing is extracted. The output filtering unit 130 may set a downscale factor based on an average interval for the input of the user. For example, the output filtering unit 130 may downscale the resolution of the frame image to a high resolution when the average interval is small and to a low resolution when the average interval is wide. The output filtering unit 130 may set a specific criterion based on user visual perception of a difference between frame images constituting screen output.

When the resolution of the recorded screen is W×H, total W·H pixels deliver information to the user. The output filtering unit 130 may reduce the resolution by downscaling the resolution of the frame image for recording screen output by using the scale factor K for more efficient analysis. At this time, the resolution of the image becomes W/K×H/K. The downscale factor K may be set to a value that is fully perceptible of important visual events on the screen even after the reduction, which can be determined here as 32.

The input/output interval extraction unit 140 may generate a distribution of the input/output interval through timings for the input of the user and the screen output. The input/output interval extraction unit 140 may calculate a difference between timings for the input of the user and the screen output, and generate a distribution including a plurality of bars based on the difference. Since the most frequency bar existing in the negative region in the distribution corresponds to a visual output that is simply triggered by a user input having a constant and short latency, the input/output interval extraction unit 140 can remove the most frequent bar in a negative region in the distribution.

The model fitting unit 150 may estimate the proactiveness and reactiveness by adjusting the distribution of input/output intervals to the proactive distribution and reactive distribution. The model fitting unit 150 may calculate the proactiveness by generating the distribution of the input/output interval as a Gaussian distribution, and may calculate the reactiveness by generating the distribution of the input/output interval as a reactive distribution including the X-Gaussian distribution. The model fitting unit 150 may adjust the characteristics of the user interface based on proactiveness and reactiveness. Here, the model fitting unit 150 may adjust the visual layout and operation function of the user interface.

The control unit (not shown in FIG. 1) may control the overall operation of the user interface device 100, and manage a control flow or a data flow between the data acquisition unit 110, the input filtering unit 120, the output filtering unit 130, the input/output interval extraction unit 140, and the model fitting unit 150.

Figure 2:
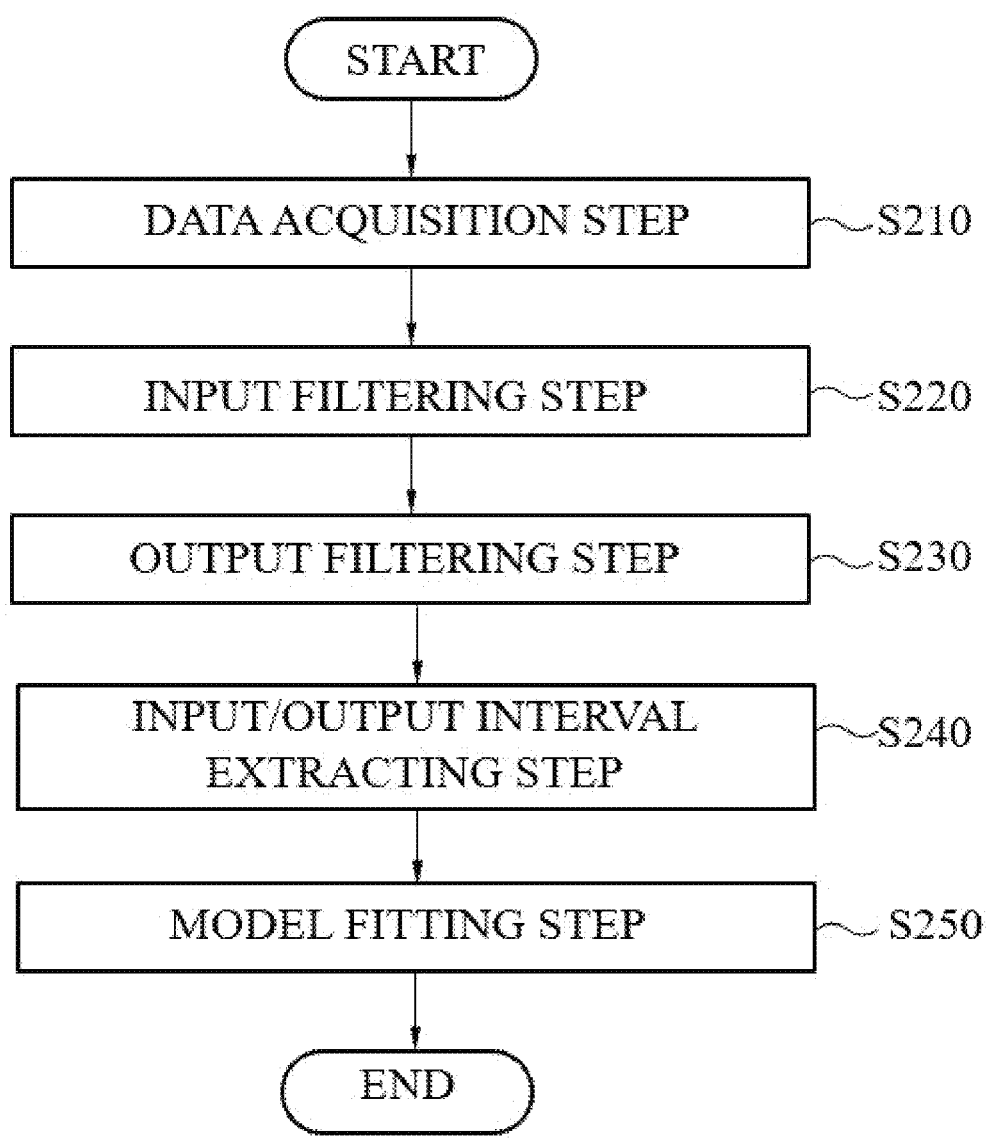
FIG. 2 is a flowchart illustrating a user interface method based on proactive and reactive input quantification according to the present disclosure.

FIG. 2 is a flowchart illustrating a user interface method based on proactive and reactive input quantification according to the present disclosure.

Referring to FIG. 2, the user interface device 100 may record the input of the user and the screen output through the data acquisition unit 110 (Step S210). The user interface device 100 may extract an input timing for the input of the user through the input filtering unit 120 (Step S220).

In addition, the user interface device 100 may extract an output timing for starting a visual change greater than or equal to a specific criterion for the screen output through the output filtering unit 130 (Step S230). The user interface device 100 may generate a distribution of input/output intervals through timings for the input of the user and the screen output through the input/output interval extraction unit 140 (Step S240).

The user interface device 100 may estimate the proactiveness and reactiveness by adjusting the distribution of input/output intervals to the proactive distribution and reactive distribution through the model fitting unit 150 (Step S250).

Hereinafter, the user interface device and method based on proactive and reactive input quantification according to the present disclosure will be described in more detail with reference to FIGS. 3 to 13.

The user interface method according to the present disclosure may evaluate the user reactiveness and proactiveness by analyzing the time interval (IOI) between the input of the user and the screen output obtained from the interaction.

A button is an input device that converts a continuous movement of the user into a discontinuous signal and transmits the signal to the computer. The purpose of the user pressing the button is to communicate his intention to the computer. In order to press the button, first, the user should recognize a current state of the computer and determine when to press the button. After determining when to press the button, the button press action is executed. Compared to a process of making a determination after recognizing the state of the computer, the button press is very short and has little effect on the user's performance, and thus, the button press may be generally ignored.

The act of pressing a button as quickly as possible after receiving unexpected feedback from the computer is called a reaction. The IOI of a reaction task is traditionally called reactive time or reaction time, and it is known that a distribution of IOI follows a unimodal distribution with a long right tail, such as an exponentially modified ex-Gaussian or log-normal. According to Hick-Hymann's law, since human information processing ability is constant, the mean of IOI in a reactive task increases in proportion to the logarithm of the number of alternative buttons that can be pressed. Meanwhile, a drift-diffusion model describes the reaction as a sequential sampling process.

According to this model, the user accumulates evidence for decision making in real time. When the amount of evidence accumulated along the way exceeds a predetermined decision boundary, the user presses the corresponding button. Unlike the Hick-Hymann law, in the drift-diffusion, it is possible to simulate the distribution of the reactive IOI.

When the user is prompted for the exact timing of pressing a button, the action is said to be predictive (prebutton input). The anticipation includes acquiring a blinking target and acquiring a moving target. The former job is to press a button at that moment in anticipation of when the blinking object will reappear. The latter task is to press a button at that moment in anticipation of when a moving target will enter the aiming area.

In the reactive task, the user's goal is to respond as quickly as possible to a given stimulus. Accordingly, the main performance metric for reactive tasks is the mean of the IOI, and in general, a good interface is one that enables a low mean, that is, one that helps the user achieve his/her goals faster. According to the drift-diffusion model, in order for a user's mean IOI to be low, a rate at which evidence of decision-making is accumulated, that is, a drift rate should be high. Meanwhile, the mean of the IOI distribution is no longer an important performance metric because the button input timing of the user in the prediction task is close to the button input timing required in the mean task. Instead, the user wants his or her button input timing to have low variability with respect to the button input timing required by the task. In other words, the main performance metric of the prediction task is a variance (or standard deviation) of the IOI distribution.

When the variance of the IOI distribution is large, it is difficult for the user to estimate the button input timing required by the computer. For example, in the blink target acquisition, the longer the repetition period of blinking, the more difficult it is for the user to estimate the timing of the next button press, which is called a scalar property of the user's internal clock. Meanwhile, in the moving target acquisition task, the shorter the time the target can be observed, that is, the shorter a cue-viewing time, the lower the button input timing estimation performance of the user. In particular, when a system wait time is long, the cue-viewing time may be further shortened because the user has to press the button without observing the target movement to the end.

The user's two representative button input strategies (reactive and proactive), mathematical models, and factors influencing each performance may be summarized in Table 1 below.

TABLE 1

| Button input strategy | Distribution of IOC | Quality measure | Factor influencing quality |
|---|---|---|---|
| Reaction | ex-Gaussian or log-normal | Mean of distribution | Stimulus familiarity, intensity, compatibility, visual clutter, number of alternatives |
| Anticipation | Gaussian | Variance of distribution | Cue-viewing time, period of blinking, system latency, reliability of sensory cue, precision of user's internal clock |

In the present disclosure, a technique for quantifying the user's button press performance in everyday interactions involving uncontrolled stimuli and unrestricted user button presses is proposed and implemented.

A first step for this is the data acquisition step, which records the input log of the user and the computer screen.

In the data collection phase, the input action of the user and the computer output are recorded over a specific period of time. The recorded input action is a time series of button input $b^{type}$ (1 when pressed, 0 when not pressed) and the cursor coordinates (in the unit of pixel if available). When the user presses different buttons, data must be recorded separately for each button (for example, $b^{ml}$ for a left mouse button and $b^a$ for a key "a"). The logged output of the computer is all frame images (24-bit RGB in this study) presented to the user on a visual display during the logging period. The pixel resolution of the frame image may vary depending on the target application and hardware.

When the frame rate of input logging is f and the number of logged frames N be f·T, and the final logging data is as follows.

$$b^{type}=[b_1^{type},b_2^{type},\ldots,b_N^{type}]$$

$$x=[x_1,x_2,\ldots,x_N]$$

$$y=[y_1,y_2,\ldots,y_N]$$

$$v=[v_1,v_2,\ldots,v_N]$$

$$t=[1/f,2/f,\ldots,T]$$

where t is the timestamp. In this study, the screen image is recorded using the open broadcaster software (OBS) (f=60 Hz), and the button input and cursor coordinates are recorded together at the moment the OBS callback function is executed using a pyuput library. The entire script is implemented in Python. The video is recorded in mp4 format, and the button input and cursor coordinates are recorded in a csv format. When recording is executed for 30 minutes according to this method at a general resolution (that is, 1680×1050), raw data file will be about 3 GB.

In a second step, the button input timing intended by the user is extracted from the input log given by input filtering.

In the input filtering step, the individual timing at which the user intended to generate button input events should be extracted from the input log data of a specific type of button $b^{type}$. According to previous studies, it takes about tens of ms from the moment the user presses the button to the moment the user releases his/her hand, and during this period, there is a moment closest to an intended input timing of the user. In this study, it may be assumed that the moment when the button input log changes from 0 to 1, that is, the moment the button starts to be pressed, is the button input activation moment intended by the user. That is, the button input timing intended by the user is determined as follows.

Find all $i$ where, $(b_i^{type}-b_{i-1}^{type})=1$

As a result, a timestamp of the input timing $t_{input}^{type}$ intended by the user using the button may be defined as follows.

$$t_{input}^{type}=[t_1^{type},t_2^{type},\ldots,t_{B^{type}}^{type}]$$

Here, $B^{type}$ is the number of input events detected by the corresponding button.

The third step is output filtering, which identifies visual changes perceptible to the user for each frame of recorded screen video.

Figure 3:
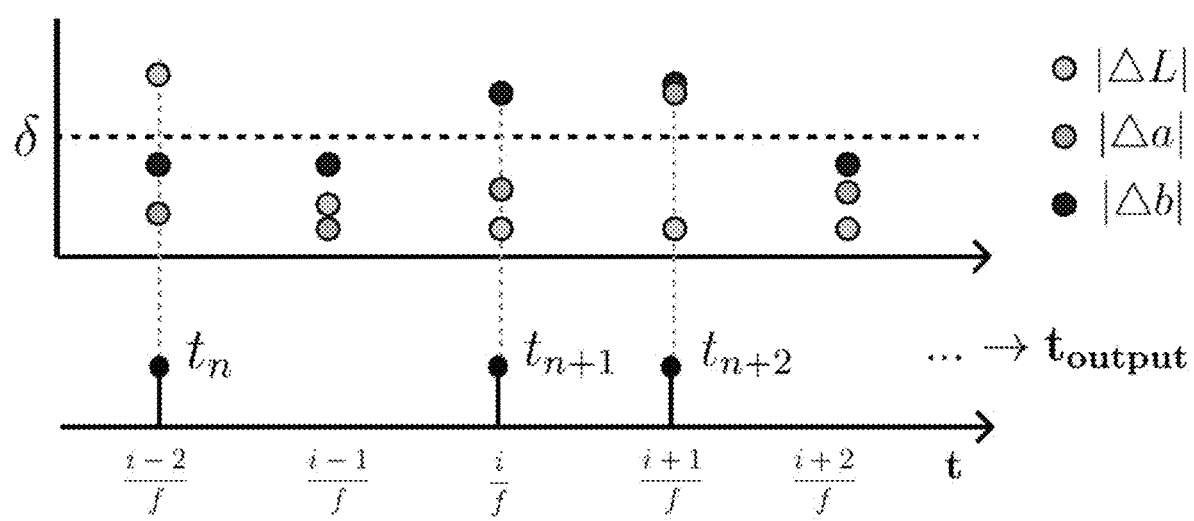
FIG. 3 is a diagram for illustrating an output timing of initiating a visual change beyond a specific reference.
Figure 4A:
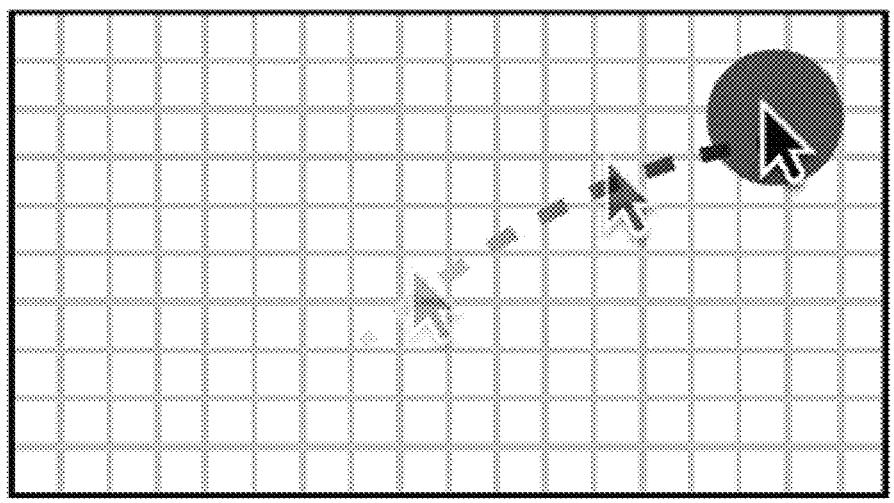
FIGS. 4A and 4B are diagrams for illustrating a screen output according to a button input accompanied by a cursor movement.
Figure 4B:
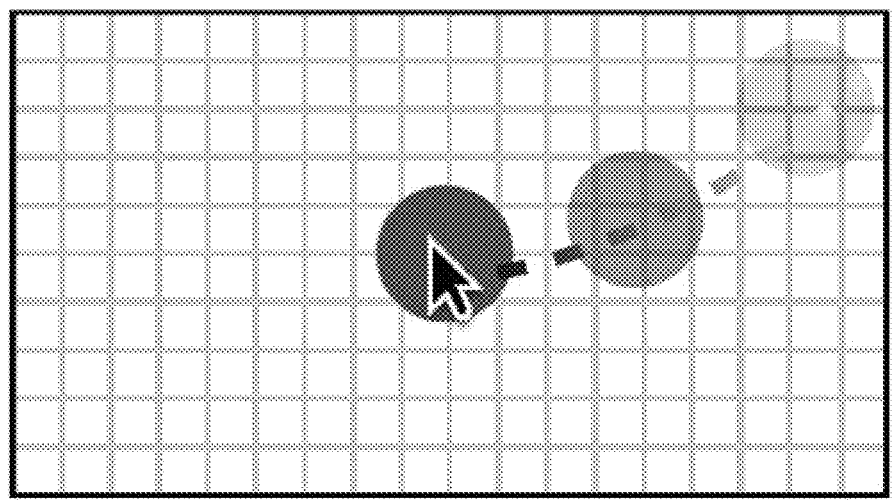

Referring FIGS. 3 to 4B, when the resolution of the recorded display is W×H, total W·H pixels deliver information to the user. For more efficient analysis, the resolution of the video is reduced using a scale factor K. Then, the resolution of the video becomes W/K×H/K. K should be set to a value that can fully detect important visual events on the screen even after the reduction. The value of K in this study is determined to be 32 in all subsequent studies. Next, the (R, G, B) values of each pixel in each frame are converted into CIELAB format (L, a, b). In CIELAB space, distances between color vectors are closer to the color differences that humans actually perceive, which allows for better detection of important visual events occurring on the screen. In this study, it is converted to CIELAB format using a convert_color function of a colormath library.

So far, there is a time series of (L, a, b) values for each of the M(=W/K·H/K) pixels. The color value $(L_i^j, a_i^j, b_i^j)$ of the j-th pixel at the i-th time step is obtained. Then, a time series of color differences between adjacent frames is obtained as in Equation 4 below.

$$(\Delta L_i^j,\Delta a_i^j,\Delta b_i^j)=(L_i^j-L_{i-1}^j,a_i^j-a_{i-1}^j,b_i^j-b_{i-1}^j) \quad \text{[Equation 4]}$$

Find all i where, $|\Delta L_i^j|>\delta$ or $|\Delta a_i^j|>\delta$ or $|\Delta b_i^j|>\delta$ In this time series, every moment when the color value changes above a certain threshold δ in at least one channel of L, a, and b is detected. In the case of FIG. 3, at each detected moment (i/f), an important visual event that can trigger the user's button press is transmitted to the user at the pixel. In this study, δ was set to 5 because humans could sufficiently perceive a color difference of about 5 Euclidean distances in the CIELAB space. As a result, the timestamp of the important visual output $t^{output}$ obtained for each j-th pixel can be expressed as Equation 5 below.

$$t_{output}{}^{j}=[t_1{}^{j},t_2{}^{j},\ldots,t_{p}{}^{j}] \quad \text{[Equation 5]}$$

Here, $P^j$ is the number of visual events detected at the j-th pixel.

Equations 4 and 5 are based on the premise that a visual event occurring at a specific (absolute) position of the display can trigger the user's button input. However, there may be special circumstances in which this assumption does not hold. For example, the user may use a computer mouse to move the cursor in the lower-left corner of the display and click on an object that appears in the upper-right corner. In this case, it is difficult to refer to that the user's button input is caused by an event in which an object appears in the upper right corner of the screen. Rather, it is more natural to assume that the user's button press occurs because the cursor has reached the target or the target is relatively close to the cursor. Therefore, the cursor-fixed coordinate system is used as a reference in the process of extracting an output that can trigger a mouse button input. More specifically, this includes moving the center of each frame vi of the screen video to the cursor position (xi,yi) as shown in FIGS. 4A and 4B before performing the processes of Equations 4 and 5 above. The (L, a, b) values of the pixels emptied by the conversion are all filled with (0,0,0).

The fourth step is the input/output interval extracting step to obtain the IOI distribution from the button input and output pairs.

In this study, the IOI can be defined as the difference between the time $t_{out}$ the output occurred and the time $t_{input}$ the user performed the corresponding button input. In general, multiple inputs and multiple outputs are observed, and combinations of these can define multiple IOIs, that is, IOI distributions. However, when the number of visual outputs observed at a particular pixel is too small, then obtaining the IOI distribution is meaningless, and thus, the analysis for the pixel may be skipped. More specifically, in this study, pixels of which the number of visual outputs is less than $1/10$ of the maximum of $P_j$ in all pixels are skipped.

Figure 5A:
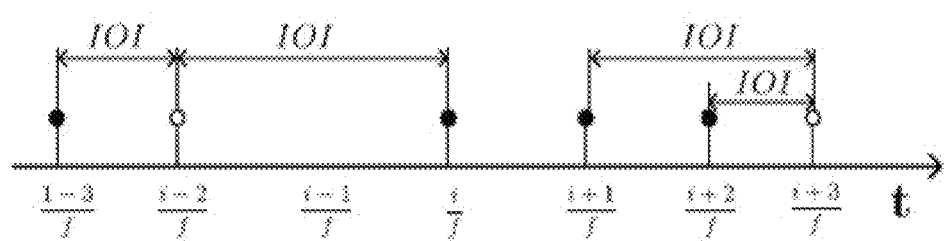
FIGS. 5A and 5B are diagrams for illustrating calculation and distribution of IOI, which is a difference between timings for an input of a user and a screen output.
Figure 5B:
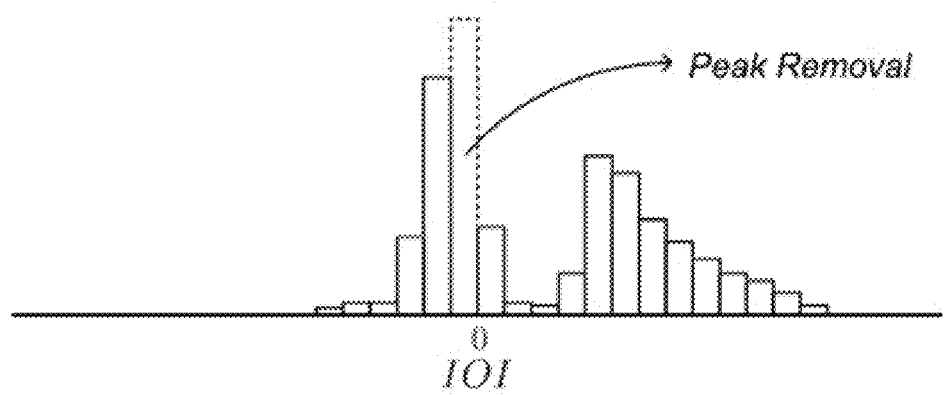

Then, in the case of non-skipped pixels, looking at each button type-pixel number j combination, referring to FIG. 5, in the case of one button type-pixel combination, the button input timing $t_{input}{}^{type}$ and visual output timing $t_{output}{}^{j}$ axes may be aligned. At this time, the IOI can be calculated according to each combination of $t^{type}$ and $t^{j}$ (refer to Equations 3 and 5), but the number of sampled IOIs is reduced by making one assumption about the human button input process. As a result, each q-th visual output may be combined with the button input $t_{k^*}{}^{type}$ closest to the time axis. The IOI can be calculated as in Equation 6 below.

$$IOI_q^{type,j} = \left(t_{k^*}^{type} - t_q^j\right) \text{ where } k^* = \underset{k}{\operatorname{argmin}}\left|t_k^{type} - t_q^j\right| \quad \text{[Equation 6]}$$

Then, as shown in Equation 7 below, it is possible to obtain an IOI distribution composed of total $P^j$ (visual output number) IOIs for one button type-pixel combination.

$$IOI^{type,j} \xleftarrow{normalize} [IOI_1^{type,j}, IOI_2^{type,j}, \ldots, IOI_{pj}^{type,j}] \quad \text{[Equation 7]}$$

As shown in of FIG. 4B through Equation 7, it can be normalized to be changed as a probability mass function.

The last step is the model fitting step to estimate the reactiveness and proactiveness by fitting the posterior distribution and the prior distribution to the obtained IOI distribution.

Figure 6:
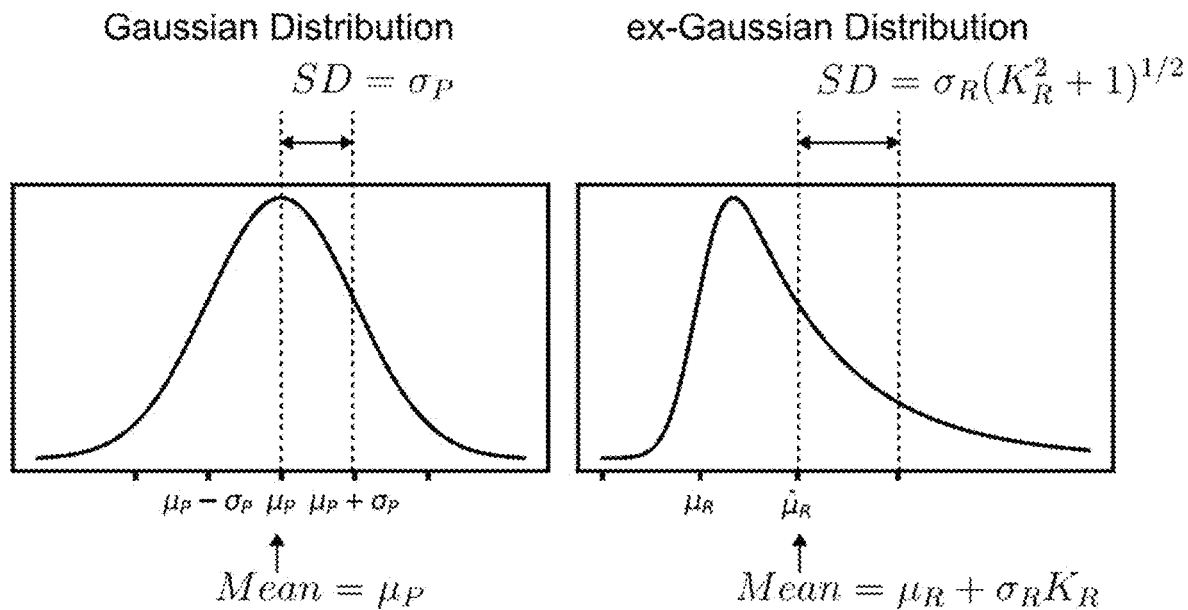
FIG. 6 is a diagram for illustrating an IOI distribution according to a button input strategy of the user.

The IOI distribution obtained in Equation 7 may be expressed as the sum of several sub-distributions. Referring to FIG. 6, FIG. 6 is an IOI distribution observed when the user actively presses a button in response to a visual output. Referring to previous studies on human active button input performance, a Gaussian distribution can be assumed as in Equation 8 below.

$$IOI_{proactive} = \frac{1}{\sigma_P\sqrt{2\pi}}\exp\left(-\frac{1}{2}\left(\frac{t-\mu_P}{\sigma_P}\right)^2\right) \quad \text{[Equation 8]}$$

Here, $\mu_p$ is the mean of the distribution, and $\sigma_p$ is the standard deviation of the distribution. These two can be grouped together and defined as the parameter $\theta_p$ of the pre-deployment.

FIG. 6 is an IOI distribution observed when the user reactively presses a button in response to a visual output. Referring to previous studies on human reaction time, the ex-Gaussian distribution of Equation 9 below can be assumed.

$$IOI_{reactive} = \frac{1}{2K_R}\exp\left(\frac{1}{2K_R^2} - \frac{t-\mu_R}{\sigma_R K_R}\right)\operatorname{erfc}\left(-\frac{(t-\mu_R)/\sigma_R - 1/K_R}{\sqrt{2}}\right),$$

$$\text{where } K > 0 \text{ and } \operatorname{erfc}(x) = \frac{2}{\sqrt{\pi}}\int_x^{\infty} e^{-t^2} dt \quad \text{[Equation 9]}$$

Here, $\mu_A$, $\sigma_R$, and $K_R$ are parameters that determine the shape of the distribution. These three may be grouped together and defined as a parameter $\theta_R$ of the response distribution. The mean of the response distribution is not $\mu_R$ but $(\mu_R+\sigma_R K_R)$. Hereinafter, the actual mean of the response distribution is expressed as $\hat{\mu}_R(=\mu_R+\sigma_R K_R)$.

Figure 7:
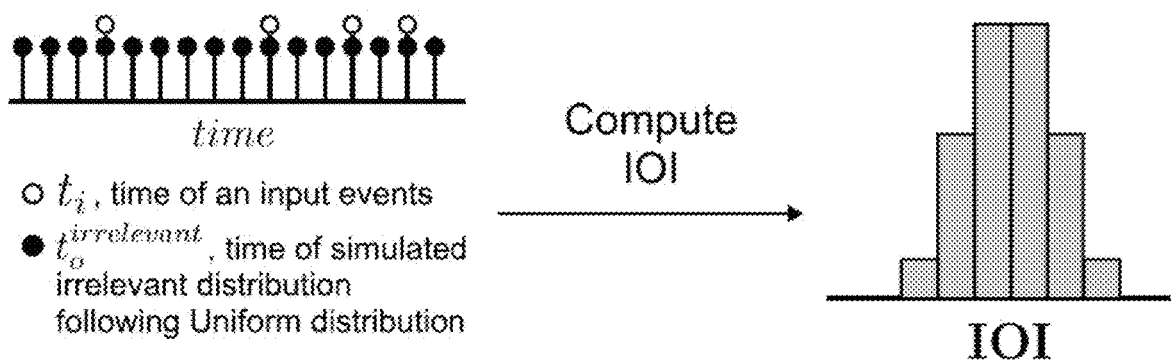
FIG. 7 is a diagram for illustrating a method of obtaining the IOI distribution using a Monte Carlo method.
Figure 8:
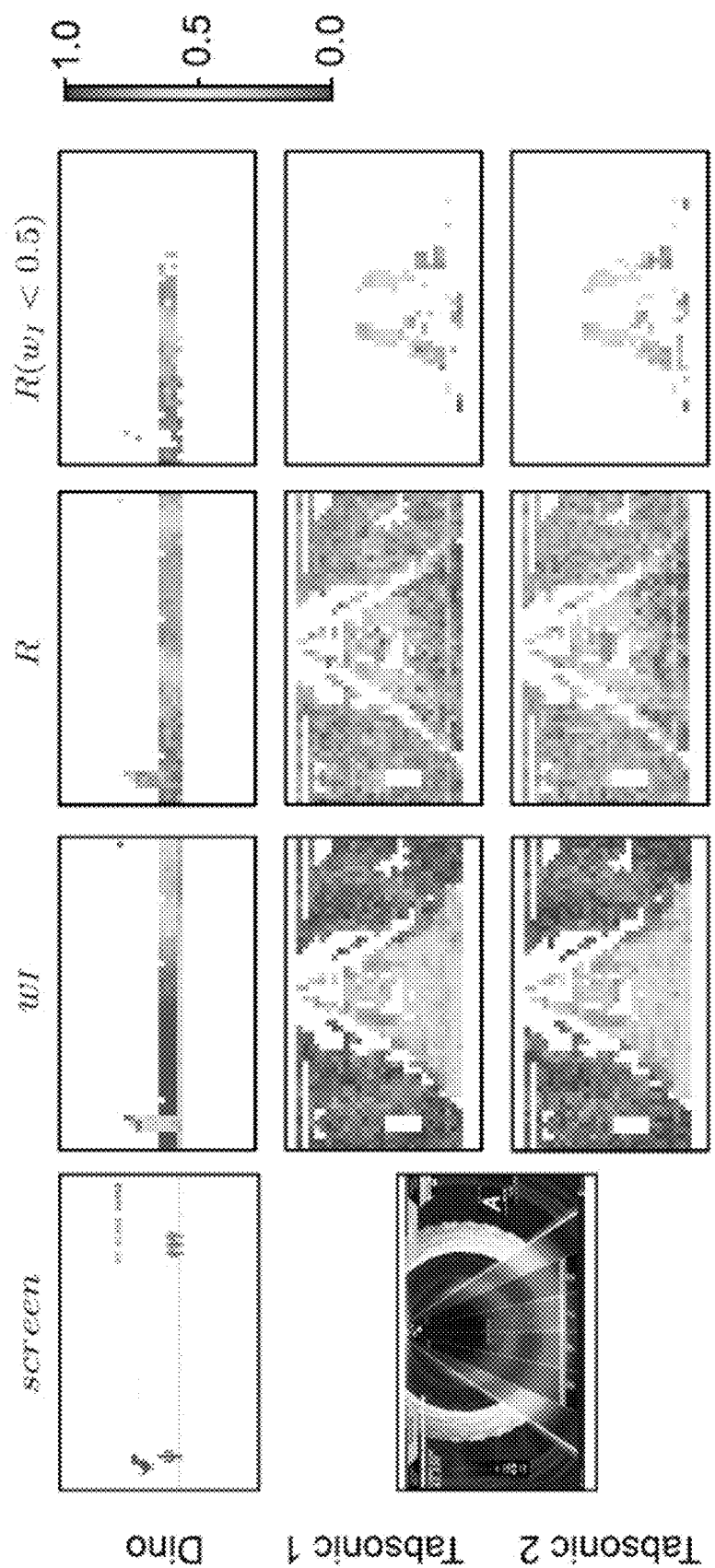
FIG. 8 is a heat map showing a mean $w_I$ (all participants) for each pixel-game type combination.

FIG. 7 shows the distribution of IOIs obtained from the visual output independent of the button input of the user. It can be assumed that the visual output independent of the button input of the user is uniformly distributed on the time axis. Since the button input timing of the user is known already, it is possible to simulate a method of obtaining an IOI distribution from a uniformly distributed unrelated output using a Monte Carlo method. The distribution thus obtained is normalized and assumed to be $I_{irrelevant}$.

Finally, some outputs do not trigger the user input, but can simply be triggered by user input. For example, when the user presses a close button, the application window closes, and in a shooting game, when the user shoots an enemy, the enemy disappears. To simplify the analysis, in this study, it is assumed that user-triggered computer output is generated with short, constant latency. This may be observed as the highest peak in the negative region in the IOI distribution obtained in Equation 7. Since this is independent of estimating the reactiveness and proactiveness of the user, the peak is removed from the distribution and the subsequent analysis is performed (refer to FIG. 5B).

The final goal of the present disclosure is to express the peak removal IOI distribution as the sum of $I_{proactive}$, $I_{reactive}$, and $I_{irrelevant}$, as in Equation 10 below.

$$IOI^{type,j} = w_R \cdot IOI_{reactive} + w_P \cdot IOI_{proactive} + w_I \cdot IOI_{irrelevant} \quad \text{[Equation 10]}$$

where, $w_R + w_P + w_I = 1$,

Here, $w_R$, $w_P$, and $w_I$ denote the weight of each sub-distribution.

In Equation 10, the weight ($w_R$, $w_P$, $w_I$) of each distribution, the response, and the parameters ($\theta_R$, $\theta_p$) of the prior distribution should be found. This is a problem of optimally fitting the mixed distribution model to the empirical distribution, and it may be performed through an expectation-maximization (EM) method. More specifically, the EM allows us to obtain parameters and weights that maximize the likelihood of observing a given IOI distribution. This can be expressed by the following Equation 11.

$$\theta_R^*, \theta_P^* = \underset{\theta_R, \theta_P}{\mathrm{argmax}}\left[\mathcal{L}(\theta_R, \theta_P; IOI^{type,j})\right] \quad \text{[Equation 11]}$$

At this this time, since it is not known from which part a specific $IOI^{type,j}$ instance originates, the likelihood cannot be calculated in Equation 11. In the EM scheme, we define the probability that each IOI instance is believed to have come from a specific distribution as a potential variable Z. Since there are 3 sub-distributions, Z is a matrix of size $3 \times P^j$. The EM technique may include two steps, an expectation step and a maximization step, which are alternately performed to estimate $\theta_R$, $\theta_p$, and Z. When the estimated Z for each sub-distribution is averaged, the weight (that is, $w_R$, $w_P$, $w_I$) of the corresponding sub-distribution is obtained. This process is repeated for all button type-pixel combinations that are not skipped.

When the final model fitting step is completed, for each button-type pixel in your hand, there may be the following information.

$w_R$ indicates how strongly the pixel is associated with the reactive input process of the user compared to other types of association.

$w_P$ indicates how strongly the pixel is connected to the pre-entry process of the user compared to other types of connections.

$w_I$ indicates how irrelevant the pixel is to the input process of the user compared to other types of association.

$\theta_R$ describes the characteristics and performance of the attempted reactive input of the user, and the value that best describes the reactive performance of the user is the mean of the $I_{reactive}$ distribution, and thus, $\hat{\mu}_R (= \mu_R + \sigma_R K_R)$ is obtained. The higher $\hat{\mu}_R$, the more difficult it is for the user to react quickly to unexpected computer output.

$\theta_p$ describes the characteristics and performance of the active input that the user tries, and among the two parameters ($\mu_P$, $\sigma_P$) belonging to $\theta_p$, $\sigma_P$ is the most important. The higher $\sigma_P$, the more difficult it is for the user to predict the output of the computer.

According to the above interpretation, $w_R$ and $w_P$ may represent the reactiveness and proactiveness of the user. However, $w_R$ and $w_P$ satisfies $w_R + w_P + w_I = 1$, that is, when there are many irrelevant outputs, $w_R$ and $w_P$ decrease as a increases. However, since the reactiveness and proactiveness aim to characterize user performance, the reactiveness and proactiveness should be able to be calculated with or without extraneous outputs. Therefore, the reactiveness R and proactiveness P for the corresponding button type-pixel combination may be defined and calculated as in Equation 12 below.

$$R^{type,j} = \frac{w_R}{w_R + w_P} \text{ and } P^{type,j} = \frac{w_P}{w_R + w_P} \quad \text{[Equation 12]}$$

Here, since R and P are obtained for each pixel, a heatmap of R and P for a particular button type may be drawn. From the heatmap, pixels on the screen have been more reactive or actively reacted by the participant may be understood. Moreover, it is possible to obtain a representative value of R and P for a specific button type by averaging R and P obtained from all pixels.

Study 1: Playing Real-Time Video Game

In Study 1, participants play two real-time video games. Those games belong to a rhythm game genre with button input. At this time, the screen image and button input log recorded through the technique proposed by the present disclosure are analyzed. Thereafter, how the parameters ($\theta_R$ and $\theta_p$) of the estimated reactiveness R, proactiveness P, and IOI distribution correlate with each participant's game score is examined.

1.1 Data Acquisition

Twenty participants (7 females, 13 males) were recruited. Their mean age was 23.9 years ($\sigma = 3.16$). Of these, 18 participants had experience playing a rhythm game.

Experiments followed a within-subject design with a game type which is a single independent variable. Three levels of independent variables are as follows.

Game type: Dino, Tabsonic 1 (sound on), Tabsonic 2 (sound off)

Participants played Chrome Dino, a game that is installed by default in the Google Chrome browser under Dino conditions. In the game, a dinosaur character is placed on the left (refer to FIG. 8). Obstacles come from right to left and get faster as the game progresses. The game is over when the dinosaur hits an obstacle. When the participant presses a button (blank or up arrow), the dinosaur jumps to avoid obstacles. In the experiment, the participants were asked to play using only the space key for simplicity.

In Tabsonic 1 and Tabsonic 2 conditions, the participants played Tabsonic Bold which was a rhythm game developed by Neowiz. In the game, the player should press the corresponding button when there is a falling note in a target area (refer to FIG. 8). When the player misses more notes than a certain threshold, the game is over. When the player survives to the end, game points are awarded. There are six lanes through which notes can fly, each mapped to the s, d, f, j, k, and l keys. The order of the notes was designed by the game designer to harmonize with the background music. Each participant played all five songs ("Jelly Fish", "Do It!", "Emoji Love", "This is You", and "Iridescent") selected by the experimenter. However, the participants played in Tabsonic 2 conditions with background music turned off. All participants played the Dino condition first, then the Tabsonic condition. The order in which Tabsonic 1 and Tabsonic 2 are given and the order in which 5 songs are given within each condition was balanced through Latin squares. The statistical analysis was performed via repeated measurement ANOVA with an $\alpha$ level of 0.05. Greenhouse-Geisser correction was applied when the sphericity assumption was violated.

The participants were seated on gaming chairs and monitors were installed at the participants' eye level. The Participants filled out an advance questionnaire and signed informed consent. Prior to this experiment, the experimenter briefly introduced the task to the participants. We asked the participants to do their best to score as high as possible. First, the participants performed the dyno condition for more than 10 minutes. The participants then played through the official Tabsonic tutorial. Next, the participants performed five songs in each condition of the Tabsonic. Switching between conditions was performed manually by the experimenter. Before and after playback, the experimenter enabled and stopped screen recording and input logging. The experiment on each individual took about 60 minutes.

All experiments were performed on a single Windows desktop computer (3.6 GHz Intel Core i9-9900k, 32 GB RAM, NVIDIA RTX2060). A 24-inch monitor (Dell) was used, and the resolution was 1680×1050 pixels. A common wired physical keyboard was used. The participants wore headphones (EPOS Sennheiser GSP 600) to listen to the sound in the Tapsonic 1 condition.

1.2 Analysis

In the experiment of Study 1, we obtain a log of button input ($b^{space}$ for Dino, and $b^z$, $b^d$, $b^f$, $b^j$, $b^k$, and $b^i$ for Tabsonic 1 and 2) and screen recordings (v) of participants in three game conditions. Since the purpose of this study was not to estimate reactiveness and proactive response to various buttons, we aggregated six independent button input logs for each Tabsonic condition into one ($b^{sdfjkl} = b^s \cup b^d \cup b^f \cup b^j \cup b^k \cup b^l$).

First, the experimenter watched all the videos one by one and recorded the number of game overs each participant experienced and the score each participant earned. The reactiveness and proactiveness were then analyzed through the steps presented in the present disclosure. The reduced video in the Dino condition for analysis had a resolution of 53×33, and the video in the Tabsonic condition for analysis had a resolution of 53×33.

As a result of the analysis, $w_R$, $w_P$, $w_I$, $\theta_R$, and $\theta_P$, were obtained for each pixel for each game type condition. This value represents an association between the participant's button press and the visual stimulus of the corresponding pixel. Moreover, these values are obtained for each participant.

All analyzes were performed on a single Windows workstation computer (2.90 GHz 64-core AMD Ryzen Threadripper 3990X, 128 GB RAM, NVIDIA Quadro RTX4000). It took about 10 minutes and 50 minutes to analyze the data that the participant played for 10 minutes in the dyno condition and the tapsonic condition. In the Dino condition, the analysis time was less because there were many skipped pixels for which a sufficient number of visual events were not observed.

1.3 Result

In the dyno condition, participants experienced a mean of 10.1 ($\sigma=4.994$) game overs and scored a mean of 1102.75 ($\sigma=618.415$) points. In the Tabsonic 1 condition and Tabsonic 2 condition, participants scored a mean of 370,178 ($\sigma=32,389$) and 352,963 ($\sigma=23,316$), respectively (considering all 5 songs). The effect of game type on game score was significant ($F_{2,38}=2397.705$, $p<0.001$, $\eta_p^2=0.992$). In particular, the difference between Tabsonic 1 and Tabsonic 2 was found to be significant in the post-hoc analysis ($p<0.01$).

The effect of game type on a mean wI (for all pixels) was statistically significant ($F_{2,38}=2397.705$, $p<0.001$, $\eta_p^2=0.992$). The mean wI was 0.328 ($\sigma=0.027$) for the Dino condition, 0.768 ($\sigma=0.023$) for the Tabsonic 1 condition, and 0.783 ($\sigma=0.022$) for the Tabsonic 2 condition. In the post-hoc analysis, $w_I$ of Dino is significantly different from Tabsonic 1 and Tabsonic 2 ($p=0.001$).

The effect of game type on mean reactiveness R (for all pixel and button types) was statistically significant ($F_{2,38}=61.493$, $p<0.001$, $\eta_p^2=0.765$). The mean of the mean R was 0.459 ($\sigma=0.021$) for the Dino condition, 0.589 ($\sigma=0.050$) for the Tabsonic 1 condition, and 0.578 ($\sigma=0.058$) for the Tabsonic 2 condition. In the post-hoc analysis, R of Dino is significantly different from Tabsonic 1 and Tabsonic 2 ($p=0.001$).

Next, the parameter $\theta_R$ obtained for each pixel was analyzed. In particular, the most important value $\hat{\mu}_R$ for describing the performance of the user in reactive button input was analyzed. The effect of game type on the mean $\hat{\mu}_R$ (for all pixels) was statistically significant ($F_{2,38}=54.148$, $p<0.001$, $\eta_p^2=0.740$). The mean of the mean $\mu_R$ was 0.357 ($\sigma=0.022$) for the Dino condition, 0.835 ($\sigma=0.199$) for the Tabsonic 1 condition, and 0.847 ($\sigma=0.204$) for the Tabsonic 2 condition. In the post-hoc analysis, $\hat{\mu}_R$ of Dino is significantly different from Tabsonic 1 and Tabsonic 2 ($p<0.001$).

Since the sum of the reactiveness R and the aggressiveness P measured for a pixel is always 1, there is no need to perform further statistical analysis of the effect of the independent variable on the aggressiveness (a reactiveness test is sufficient). The active heat map is also obtained by subtracting the reactiveness value from 1, so there is no need to draw it separately. Instead, the parameter $\theta_P$ obtained for each pixel was analyzed. In particular, $\sigma_P$ which was the most important parameter to describe the user's performance in the active button input was analyzed. The effect of game type on the mean $\sigma_P$ (for all pixels) was statistically significant ($F_{2,38}=8.577$, $p<0.01$, $\eta_p^2=0.333$). The means $\sigma_P$ of Dino, Tabsonic 1, and Tabsonic 2 were 0.088 ($\sigma=0.004$), 0.101 ($\sigma=0.016$), and 0.106 ($\sigma=0.019$). In the post-hoc analysis, $\sigma_P$ of Dino is significantly different from Tabsonic 1 and Tabsonic 2 ($p<0.01$).

Figure 9:
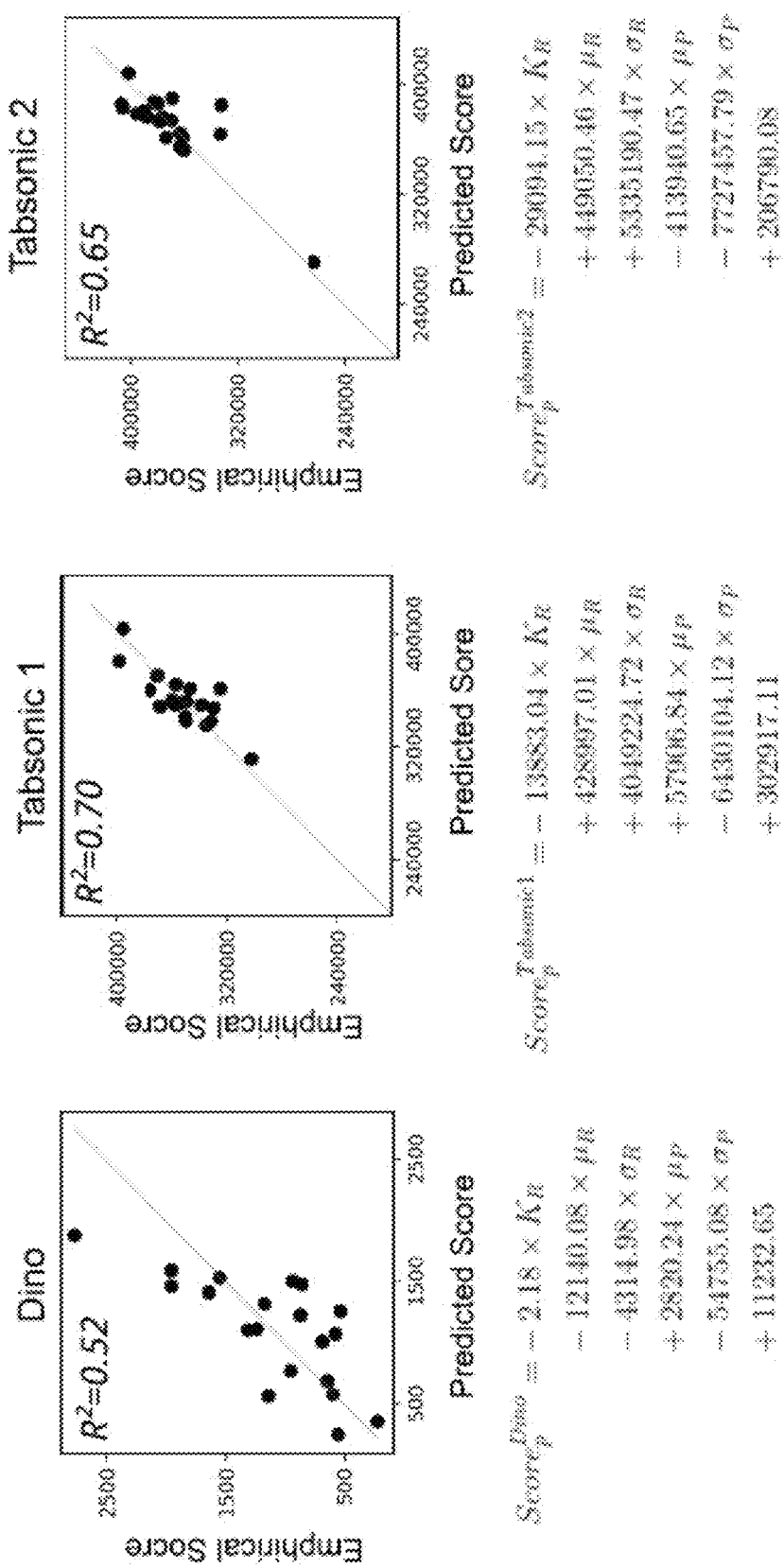
FIG. 9 is a diagram showing a linear regression result between an estimated IOI distribution parameter for each game and a game score.

A linear regression analysis was performed on how well each participant's cognitive trait parameters $\theta_R$ and $\theta_P$ explain the participant's game score. First, $\theta_R$ and $\theta_P$ of all pixels in each game type participant combination were averaged. Then, using the scikit-learn library, a linear regression analysis was performed between the outcome five parameters ($\mu_R$, $\sigma_R$, $K_R$, $\mu_P$, $\sigma_P$) and the participant's score. As a result, the participants' game scores were predicted in five parameters with high coefficients of determination of Dino (=0.52), Tabsonic 1 (=0.70), and Tabsonic 2 (=0.65). Each regression equation and plot are shown in FIG. 9.

1.4 Discussion

When playing a real-time game, the player is asked to press a button in various ways. In the case of the Dino, for example, the player presses a button to prevent the dinosaur from hitting a moving obstacle. In the case of the Tabsonic, the player should press a button when the moving target is positioned within a specific acquisition area. However, it is often too late for the player to start planning and executing at the moment when the decisive event (the obstacle hits the dinosaur or the target is in the acquisition area) actually occurs. Thus, the player should trigger the button press while relying on sensory cue provided to the player before the event occurs. In Study 1, we succeeded in figuring out how a visual event generated from the pixel on the screen triggered the participant's button input in both Dino and Tabsonic conditions.

First, looking at the heat map $w_I$ of the dyno state (refer to FIG. 8), the visual event that occurred in the area where the dinosaur moves up and down and the area at the right end of the screen did not seem to be significantly related to the button input. The reasons for obtaining these results are as follows. (1) A jumping action of the dinosaur is an event triggered by the participant's button press, rather a sensory cue that forces the participant to plan and execute the button press. (2) When the obstacle appears in the rightmost area, the situation is not urgent enough to worry about colliding with the dinosaur or pressing a button.

Next, looking at the reactiveness (or active) heatmap in the dyno condition, a visual event that occurred on a pixel in front of the dinosaur triggers the participant's active button input, and visual event that occurred in pixels a little further away caused the participant's reactive button inputs. This is because as the obstacle approaches the dinosaur, when the participant responds only to the approach of the obstacle, the dinosaur cannot be prevented from hitting the obstacle.

A similar trend was observed with the $w_I$ heatmap of Tabsonic and the R heatmap since both Tabsonic and Dino are basically games with moving targets (or obstacles). In the area outside the lane where the target moves, the value of $w_I$ was high. A visual event that occurred immediately in front of the acquisition area triggered the participant's pre-button input, and a visual event that occurred a little further away triggered the participant's reaction button input.

Meanwhile, unlike the Tabsonic 1 condition, in the Tabsonic 2 condition, a background music was turned off. In general, in rhythm games like Tabsonic, the beat of the background music is synchronized with the moment the target reaches the acquisition area. Accordingly, the background music provides an additional sensory cue that allows the participant to estimate the timing of button presses. According to cue integration theory, additional sensory cues always improve the reliability of the participant's button press performance. In fact, the scores of participants in the Tabsonic 1 condition were significantly higher than those of the participants in the Tabsonic 2 condition. In the case of $\sigma_P$, Tabsonic 2, which was a distribution parameter indicating the quality of active button input estimated by the method of the present disclosure, obtained a higher value than Tabsonic 1, but the difference therebetween was not statistically significant.

There are a total of five distribution parameters ($K_R$, $\mu_R$, $\sigma_R$, $\mu_P$ and $\sigma_P$) for each participant estimated by the analysis technique of the present disclosure. Each participant's distribution parameter correlated with the participant's game score with a high coefficient of determination (refer to FIG. 9).

Figure 10:
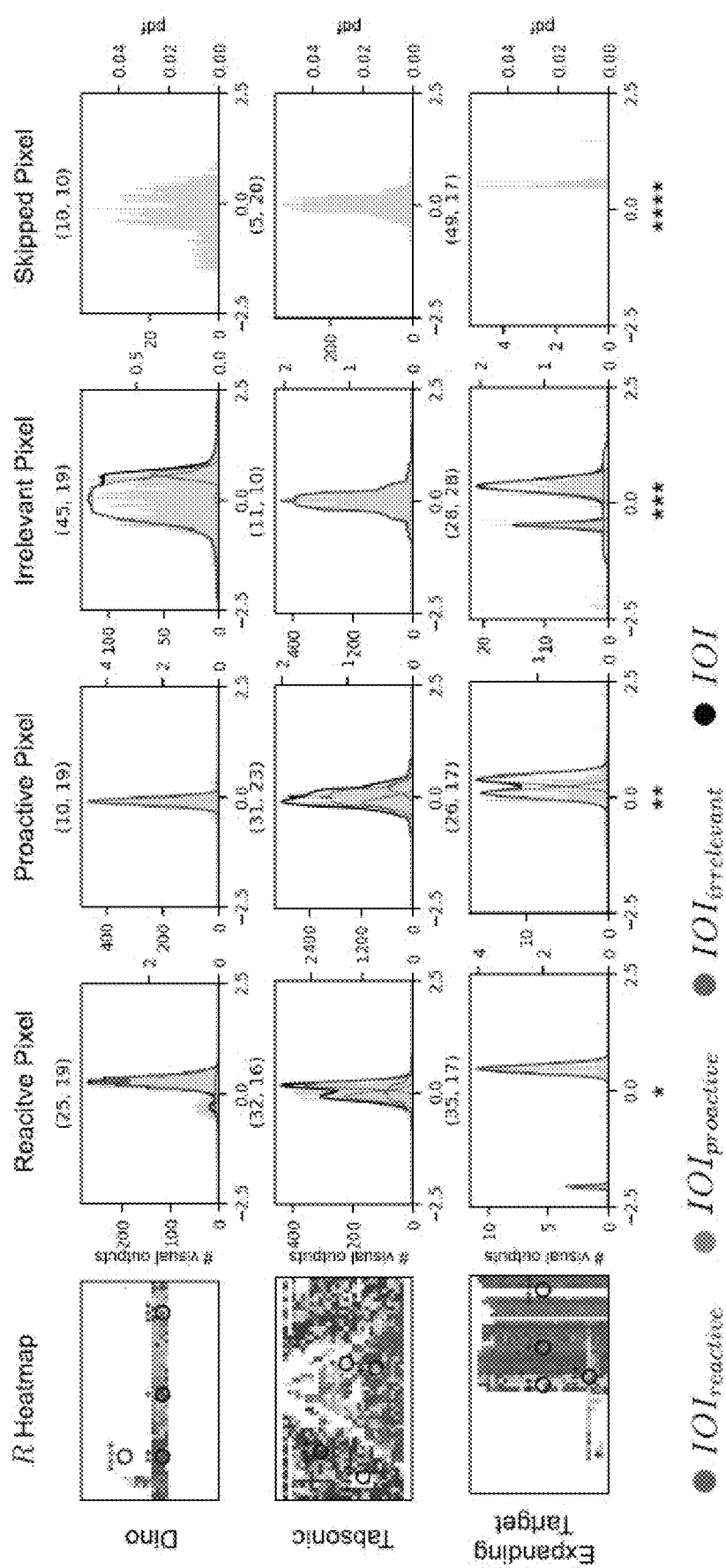
FIG. 10 is a diagram for illustrating an experimental result for model fitting.
Figure 11:
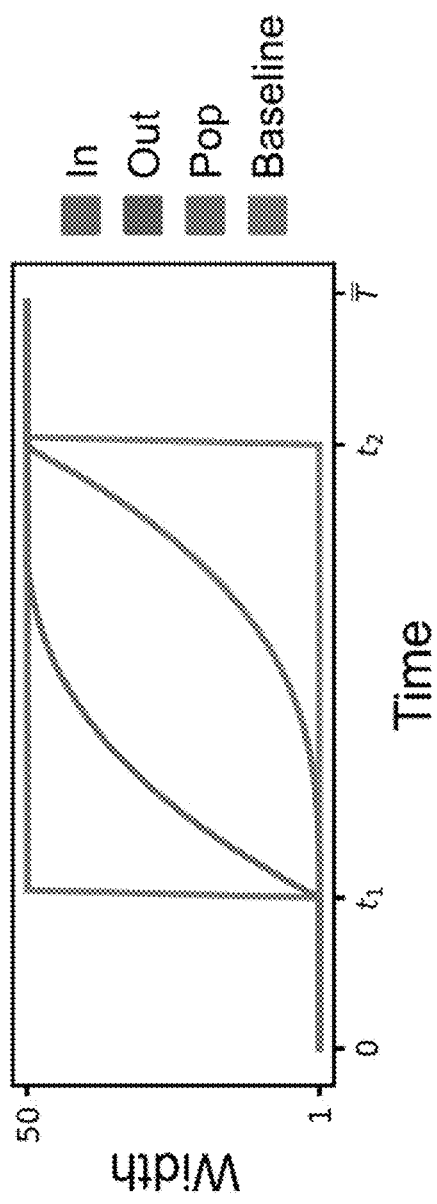
FIG. 11 is a diagram for illustrating design of a self-expanding target clicked by the user in Study 2.
Figure 12:
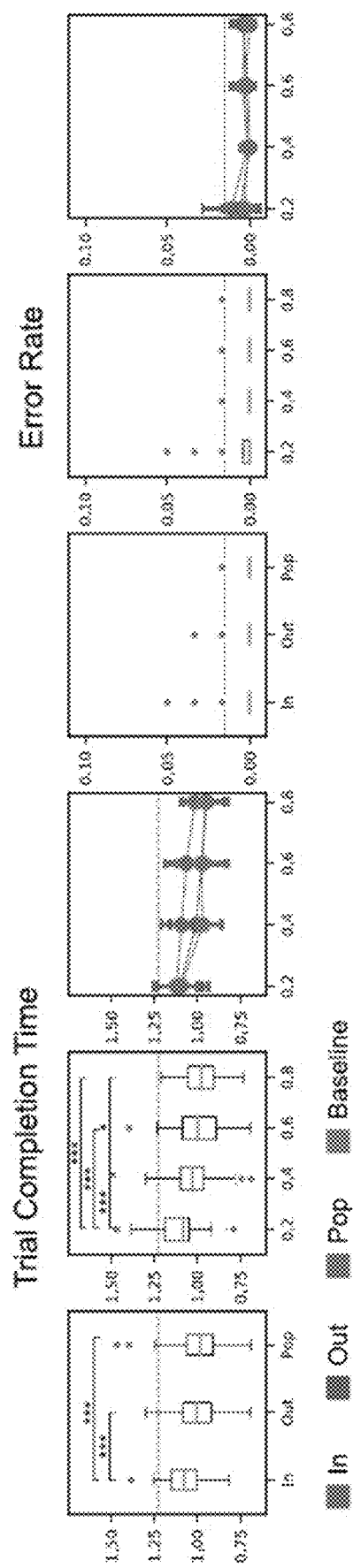
FIG. 12 is a diagram for illustrating a trial completion time and an error rate as a result of Study 2.
Figure 13:
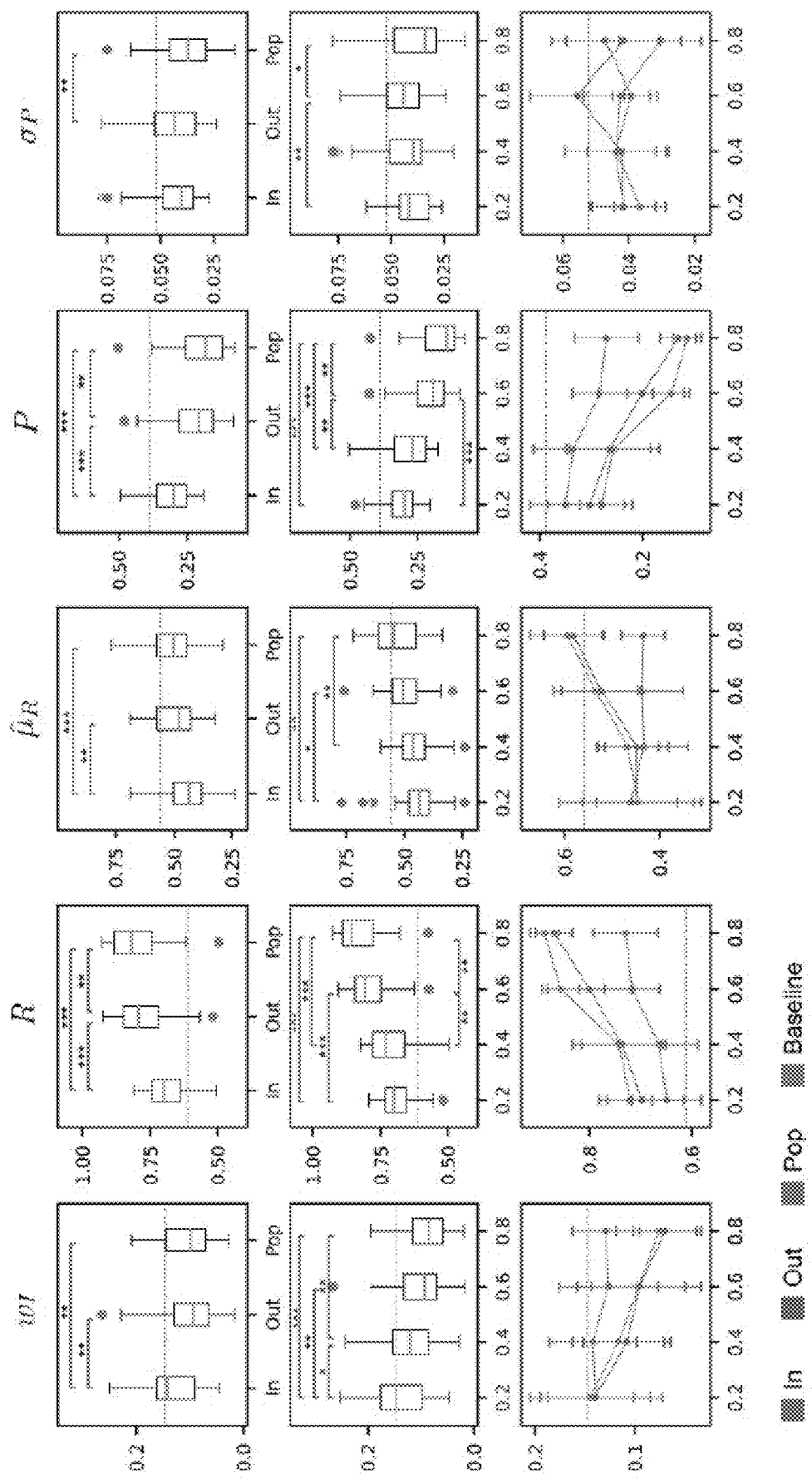
FIG. 13 is a diagram illustrating reactiveness and proactiveness as the result of Study 2.

FIG. 10 is a diagram showing model fitting results for some representative pixels in Study 1 and Study 2.

Study 2: Pointing to Self-Expansion Goal

In Study 2, the participants performed the task of clicking and pointing at an object that grew in size on their own. Here, the participants control a cursor with a trackpad. After moving the video frame so that the position of the cursor is in the center, we analyze the participant's reactiveness and initiative using the proposed technique. We give various patterns of target expansion and explores how participants' reactiveness and initiative, and the quality of each button input changed.

2.1 Method

Twelve participants (8 males and 4 females) were recruited, their mean age was 24.83 years ($\sigma$=3.24 years), and of these, 9 participants reported daily trackpad use.

In Study 2, the participants controlled a cursor with a trackpad to click on a band-shaped target. When the participant moves the cursor to a predefined starting position and stays for a period of time (0.5 seconds), the object appears at a certain distance (900 pixels). An initial width of the object is 1 pixel. Assuming that t=0 when the object appears, the object begins to expand in the width direction at $t=t_1$. Expansion continues until $t=t_2$ and then stops. When the participant clicks inside or outside the target, the attempt ends and the target disappears. When the object is fully expanded, it is 50 pixels wide.

The time $t_2$ at which the target expansion ends was set differently for each participant. More specifically, $t_2$ was set as the mean time ($\overline{T}$) it took the participant to acquire a normal object at a distance of 900 pixels and a width of 50 pixels multiplied by 0.8 (that is, $t_2=0.8\overline{T}$). To this end, each participant was asked to click on a target (50 pixels wide, 900 pixels distant) as quickly and accurately as possible 60 times before this experiment. As with the task of this experiment, the object of the trial appeared only when the cursor stayed at the starting position for 0.5 seconds. Both failed and successful attempts were considered when calculating the mean time ($\overline{T}$).

The main experiment followed a 3×4 within-subject design with two independent variables, Easing and Duration, related to the pattern in which subjects expanded. The levels are as follows.

Easing: In, Out, Pop
Duration: 0.2, 0.4, 0.6, 0.8

Here, Duration=$t_1$. The time $t_1$ at which the object starts to expand as $\overline{T}$ is determined. That is, the time required for the object to expand is $(t_2-t_1)=(0.8-\text{Duration})\overline{T}$. Relief represents a pattern in which the object expands. For each Easing condition, the target width W as a function of time can be expressed as follows.

For In condition, $$W(t) = 1 + 49\left(\frac{t-t_1}{t_2-t_1}\right)^3 \text{ where } t \in [t_1, t_2]$$

For Out condition, $$W(t) = 1 + 49\left(1 - \left(\frac{t_2-t}{t_2-t_1}\right)^3\right) \text{ where } t \in [t_1, t_2]$$

For Pop condition, W(t)=50 where $t \in [t_1,t_2]$

When t is less than $t_1$, the width of the object is 1 pixel in all conditions, and when t is greater than $t_2$, the width of the object is 50 pixels in all conditions. Each condition is also visualized in FIG. 12.

All participants, regardless of experimental design, were given baseline conditions. The baseline conditions mean that the Easing variable is set to Pop and the Duration variable is set to 0. In the case of the baseline condition, the target width W as a function of time can be expressed as follows.

For In condition, W(t)=1 where $t \in [t_1,t_2]$

For each unique Easing-Duration combination, including baseline conditions, the participants performed 60 target acquisition trials. All task combinations were given to participants in random order. The statistical analysis was performed via repeated measurement ANOVA with an $\alpha$ level of 0.05.

All experiments were performed on a single Windows desktop computer (3.6 GHz Intel Core i9-9900k, 32 GB RAM, NVIDIA RTX2060). A 24-inch monitor (Dell) was used, and the resolution was 1680×1050 pixels. An Apple trackpad (Magic Trackpad) was used as a pointing device. The working application was written in the Python language (running at about 60 Hz).

2.2 Analysis

In Study 2 experiment, we obtained the participant's mouse button input log ($b_{click}$), screen recording (v), and cursor coordinates (x and y) for each Easing-Duration combination, including reference conditions. The size of the entire data set was about 852 MB.

As in Study 1, the reactiveness and proactiveness of the data set were analyzed following the steps described in the present disclosure. The reduced screen video has a resolution of 55×33 in pixels. As a result of the analysis, $w_R$, $w_P$, $w_I$, $\theta_R$, and $\theta_p$ were obtained for each pixel of each Easing-Duration combination. This value represents the association between the participant's mouse button press and the visual stimulus of the corresponding pixel.

2.3 Results

The task completion time is the time difference between when the object appears and when the button is clicked. The effect of relief on task completion time was statistically significant ($F_{2,22}=15.515$, $p<0.001$, $\eta_p^2=0.585$). The mean trial completion time of In, Out, and Pop was 1.07 ($F_{3,33}=20.690$, $p<0.001$, $\eta_p^2=0.653$). The means of trial completion times for 0.2, 0.4, 0.6, and 0.8 were 1.104 ($\sigma=0.138$), 1.021 ($\sigma=0.135$), 1.002 ($\sigma=0.0.143$), and 0.969 ($\sigma=0.110$). The interaction effect of Easing and Duration on task completion time was not statistically significant ($F_{6,66}=1.135$, $p=0.347$, $\eta_p^2=0.094$).

The error rate is the number of failed attempts divided by the total number of attempts. The effect of mitigation on the error rate was not statistically significant ($F_{2,23}=2.333$, $p=0.121$, $\eta_p^2=0$). Moreover, the effect of Duration on the error rate was not statistically significant ($F_{3,33}=2.112$, $p=0.118$, $\eta_p^2=0.25$). The interaction effect of Easing and Duration on the error rate was not statistically significant ($F_{6,66}=1.369$, $p=0.240$, $\eta_p^2=0$).

Easing effect for irrelevant was statistically significant ($F_{2,32}=72497$, $p<0.01$, $\eta_p^2=0.406$). The means of mean Irrelevance were 0.134 ($\sigma=0.048$) in the In state, 0.103 ($\sigma=0.054$) in the Out state, and 0.108 ($\sigma=0.050$) in the Pop state. The effect of Duration on $w_I$ was statistically significant ($F_{3,33}=10.032$, $p<0.001$, $\eta_p^2=0.480$). The means of average $w_I$ for 0.2, 0.4, 0.6, and 0.8 were 0.141 ($\sigma=0.054$), 0.122 ($\sigma=0.045$), 0.106 ($\sigma=0.054$), and 0.092 ($\sigma=0.044$). There was not a significant interaction effect between Easing and Duration on $w_I$ ($F_{6,66}\sigma=1.222$, $p=0.306$, $\eta_p^2=0.099$).

The effect of Easing on reactiveness R was statistically significant ($F_{2,22}=54.403$, $p<0.001$, $\eta_p^2=0.832$). The means R of In, Out, and Pop were 0.690 ($\sigma=0.072$), 0.776 ($\sigma=0.096$), and 0.802 ($\sigma=0.090$). The effect Duration on R was statically significant ($F_{3,33}=29.777$, $p<0.001$, and $\eta_p^2=0.731$). The means R of 0.2, 0.4, 0.6, and 0.8 were 0.690 ($\sigma=0.071$), 0.715 ($\sigma=0.088$), 0.791 ($\sigma=0.082$), and 0.829 ($\sigma=0.084$). The interaction effect of relaxation and persistence times for R was statistically significant ($F_{6,66}=3.373$, $p<0.01$, $\eta_p^2=0.236$). The post-hoc analysis showed that there was a significant difference between In and Out when Durations were 0.4, 0.6, and 0.8 ($p<0.001$), there was a significant difference ($p<0.05$) between In and Pop in all Duration conditions, and the duration was 0.6 ($p<0.05$).

Next, the parameter $\theta_R$ obtained for each pixel was analyzed. In particular, the most important value $\hat{\mu}_R$ for describing the user's performance in reactive button input was analyzed. Easing effect for $\hat{\mu}_R$ was statistically significant ($F_{2,22}=22.796$, $p<0.001$, $\eta_p^2=0.675$). The means $\hat{\mu}_R$ of In, Out, and Pop were 0.442 ($\sigma=0.099$), 0.5 ($\sigma=0.092$), and 0.51 ($\sigma=0.105$). The effect of Duration on $\mu_R$ was statically significant ($F_{1.585,17.433}=14.569$, $p<0.001$, and $\eta_p^2=0.570$). The means of mean $\hat{\mu}_R$ of 0.2, 0.4, 0.6, and 0.8 were 0.451 ($\sigma=0.117$), 0.405 ($\sigma=0.076$), 0.498 ($\sigma=0.095$), and 0.0 ($\sigma=0.095$). Moreover, the interaction effect of relaxation and persistence times for $\hat{\mu}_R$ was statistically significant ($F_{6,66}=0.073$, $p<0.01$, $\eta_p^2=0.236$). The post-hoc analysis showed that there was a significant difference between In and Pop when Durations were 0.6 and 0.8 ($p<0.001$) and there was a significant difference between In and Out when Duration was 0.6 and 0.8 ($p<0.01$).

Since the sum of the reactiveness R and the aggressiveness P measured for a pixel is always 1, there is no need to perform further statistical analysis of the effect of the independent variable on the aggressiveness (the reactiveness test is sufficient). The active heat map is also obtained by subtracting the reactiveness value from 1, and thus, there is no need to draw it separately. Instead, the parameter $\theta_P$ obtained for each pixel was analyzed. In particular, $\sigma_p$ which was the most important parameter to describe the user's performance in the dictionary button input was analyzed. The effect of Easing on $\sigma_P$ was statically significant ($F_{2,22}$, $p<0.05$, and $\eta_p^2=0.25$). The means $\sigma_P$ of In, Out, and Pop were 0.043 ($\sigma=0.012$), 0.045 ($\sigma=0.014$), and 0.038 ($\sigma=0.013$). The effect of Duration on $\sigma_P$ was not statistically significant (F3.33=8.841, $p=0.73$, $\eta_p^2=0.5$). The means $\sigma_P$ of 0.2, 0.4, 0.6, and 0.8 were 0.040 ($\sigma=0.009$), 0.043 ($\sigma=0.014$), 0.046 ($\sigma=0.013$), 0.013, and 0.010. The interaction effect of Easing and Duration on $\sigma_P$ was statistically significant ($F_{6,66}=3.348$, $p<0.05$, $\eta_p^2=0.25$). Post-hoc analysis showed significant difference between In and Pop when Duration was 0.8 ($p<0.05$), a significant difference between In and Out when Duration was 0.6 ($p<0.01$), and significant difference between Out and Pop when Duration was 0.6 and 0.8 ($p<0.05$).

Figure 14:
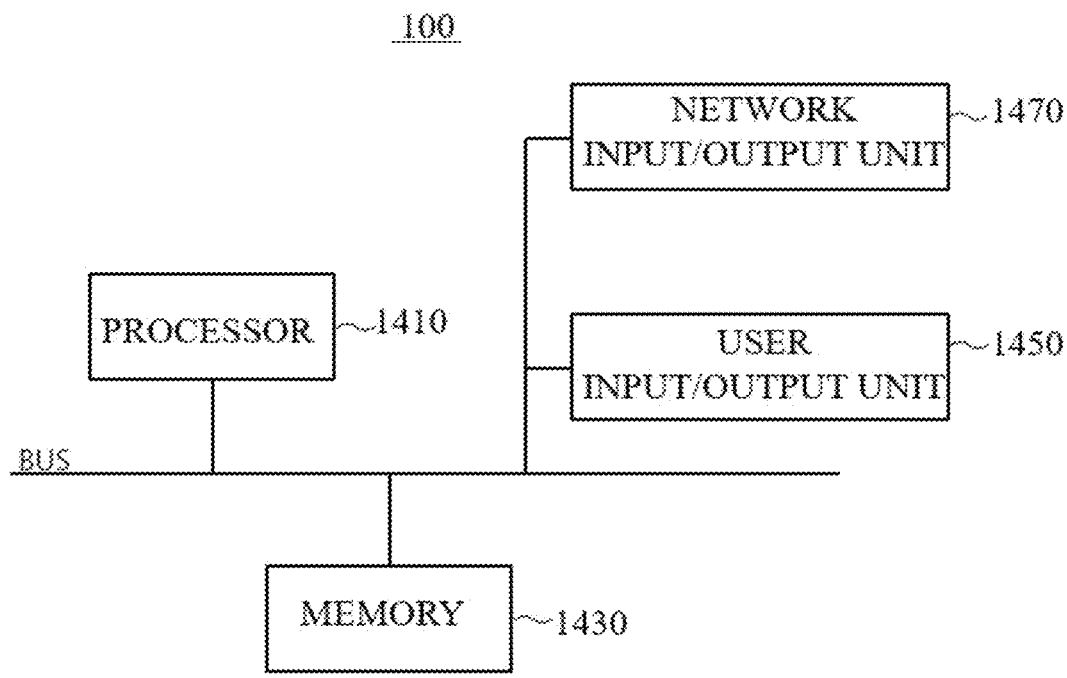
FIG. 14 is a diagram for illustrating a system configuration of the user interface device according to the present disclosure.

According to the user interface method according to the present disclosure, it is possible to quantify the reactiveness and proactiveness of the user button input by analyzing only the screen image and the input log. Here, the reactiveness and proactiveness may refer to how actively or actively the user plans and executes a button input according to a given output of the computer. In the present disclosure, considering that the IOI (Input-to-Output) distribution of the user is uniquely determined according to various button input strategies, it is possible to measure the user's reactiveness and proactiveness as well as the user's execution quality for each strategy. FIG. 14 is a diagram for illustrating a system configuration of the user interface device according to the present disclosure.

Referring to FIG. 14, the user interface device 100 may include a processor 1410, a memory 1430, a user input/output unit 1450, and a network input/output unit 1470.

The processor 1410 may execute a user interface procedure based on proactive and reactive input quantification according to an embodiment of the present disclosure, manage the memory 1430 read or written in this process, and schedule the synchronization time between the volatile memory and non-volatile memory in the memory 1430. The processor 1410 may control the overall operation of the user interface device 100, and is electrically connected to the memory 1430, the user input/output unit 1450, and the network input/output unit 1470 to control data flow between them. The processor 1410 may be implemented as a central processing unit (CPU) of the user interface device 100.

The memory 1430 is implemented as a non-volatile memory such as a solid state disk (SSD) or a hard disk drive (HDD), and may include an auxiliary storage device used to store overall data required for the user interface device 100 and include a main storage device implemented as a volatile memory such as random access memory (RAM). Moreover, the memory 1430 may store a set of instructions for executing the user interface method according to the present disclosure by being executed by the electrically connected processor 1410.

The user input/output unit 1450 may include an environment for receiving a user input and an environment for outputting specific information to the user, and for example, include an input including an adapter such as a touch pad, a touch screen, an on-screen keyboard, or a pointing device, or an output device including adapters such as monitors or touch screens. In an embodiment, the user input/output unit 1450 may correspond to a computing device accessed through remote access, and in such a case, the user interface device 100 may be implemented as an independent server.

The network input/output unit 1470 provides a communication environment to be connected to the user terminal 1510 through a network, and, for example, may include an adapter for communication such as a local area network (LAN), a metropolitan area network (MAN), a wide area network (WAN), and a Value Added Network (VAN). In addition, the network input/output unit 1470 may be implemented to provide a short-range communication function such as WiFi or Bluetooth or a wireless communication function of 4G or higher for wireless data transmission.

Figure 15:
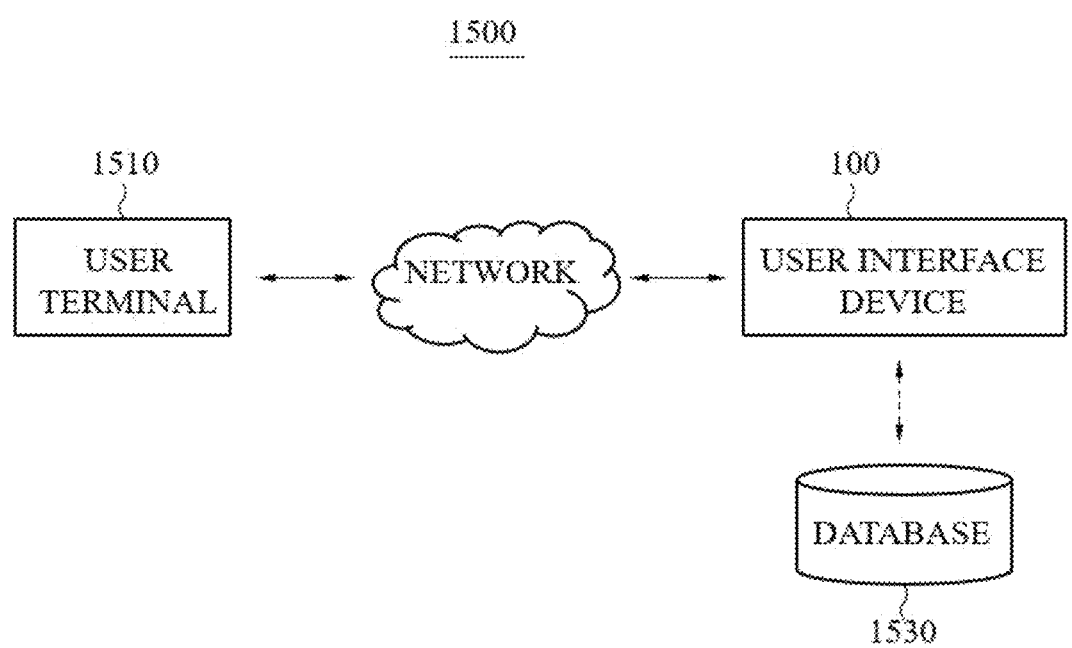
FIG. 15 is a diagram for illustrating the user interface system according to the present disclosure.

FIG. 15 is a diagram for illustrating a user interface system according to the present disclosure.

Referring to FIG. 15, a user interface system 1500 may include a user terminal 1510, a user interface device 100, and a database 1530.

The user terminal 1510 may correspond to a terminal device operated by a user. In an embodiment of the present disclosure, a user may be understood as one or more users, and a plurality of users may be divided into one or more user groups. Moreover, the user terminal 1510 is a device constituting the user interface system 1500, and may correspond to a computing device that operates in conjunction with the user interface device 100. For example, the user terminal 1510 may be implemented as a smart phone, a notebook computer, or a computer that is connected to the user interface device 100 and is operable, and is not necessarily limited thereto, and may be implemented in various devices including a tablet PC. Moreover, the user terminal 1510 may install and execute a dedicated program or application (or app) for interworking with the user interface device 100.

The user interface device 100 may be implemented as a server corresponding to a computer or program performing the user interface method according to the present disclosure. In addition, the user interface device 100 may be connected to the user terminal 1510 through a wired network or a wireless network such as Bluetooth, WiFi, LTE, or the like, and may transmit/receive data to and from the user terminal 1510 through the network.

In addition, the user interface device 100 may be implemented to operate in connection with an independent external system (not shown in FIG. 1) in order to perform a related operation. For example, the user interface device 100 may be implemented to provide various services by interworking with a portal system, an SNS system, a cloud system, and the like.

The database 1530 may correspond to a storage device for storing various types of information required in the operation process of the user interface device 100. For example, the database 1530 may store information about video and store information about training data and models, but the present disclosure is not limited thereto, and the database 1530 may store the information collected or processed in various forms in the process in which the user interface device 100 performs the user interface method according to the present disclosure.

In addition, in FIG. 15, the database 1530 is illustrated as a device independent of the user interface device 100. However, the present disclosure is not necessarily limited thereto, and the database 1530 may be implemented by being included in the user interface device 100 as a logical storage device.

Although the above has been described with reference to preferred embodiments of the present disclosure, those skilled in the art will understand that various modifications and changes to the present disclosure may be made without departing from the spirit and scope of the present disclosure described in the claims below.

[Detailed Description of Main Elements]

100: user interface device
110: data acquisition unit
120: input filtering unit
130: output filtering unit
140: input/output interval extraction unit
150: model fitting unit
1500: user interface system

What is claimed is:

1. A user interface device based on proactive and reactive button input quantification, the user interface device comprising:
    a data acquisition unit configured to record a plurality of button inputs of a user and a plurality of screen outputs of a screen leading to or in response to the button input of the user;
    an input filtering unit configured to extract an input timing for each of the button inputs of the user;
    an output filtering unit configured to extract an output timing to start a visual change beyond a specific reference for each of the screen outputs;
    an input/output interval extraction unit configured to generate a distribution of input/output intervals through timings for the button inputs and the screen outputs of the user; and
    a model fitting unit configured to estimate a proactiveness quality and a reactiveness quality by adjusting the distribution of the input/output intervals to fit a proactive distribution model and a reactive distribution model,
    wherein the output filtering unit downscales a resolution or a frame rate of a frame image for recording the screen output before extraction of the output timing based on an average interval for the button inputs of the user, and
    wherein the data acquisition unit, the input filtering unit, the output filtering unit, the input/output interval extraction unit, and the model filtering unit are each implemented via at least one processor.

2. The user interface device of claim 1, wherein the data acquisition unit is further configured to record time series input actions of the user for each input entity for a specific section and records a time series output of the screen for each frame image.

3. The user interface device of claim 1, wherein the input filtering unit is further configured to extract a discrete timing of each of the button inputs of the user based on generation of an input event.

4. The user interface device of claim 1, wherein the output filtering unit is further configured to extract the output timing based on the screen output through (1) a visual change on the screen triggered by the button input of the user, (2) a visual change on the screen that triggers the reactive button input of the user, (3) a visual change on the screen that triggers the proactive button input of the user, and (4) a visual change on the screen completely independent of the button input of the user.

5. The user interface device of claim 1, wherein the output filtering unit is further configured to set a factor of the downscale based on an average interval for the button input of the user.

6. The user interface device of claim 5, wherein the output filtering unit is further configured to set a specific criterion based on a user visual perception of a difference between frame images constituting the screen output.

7. The user interface device of claim 1, wherein the input/output interval extraction unit is further configured to calculate a difference between timings for the button input of the user and the screen output and generates generate a distribution including a plurality of bars based on the difference.

8. The user interface device of claim 7, wherein the input/output interval extraction unit is further configured to remove a most frequent bar existing in a negative region of the distribution.

9. The user interface device of claim 1, wherein the model fitting unit is further configured to calculate the proactiveness quality by generating the distribution of the input/output intervals as a Gaussian distribution, and calculate the reactiveness quality by generating the distribution of the input/output intervals as a reactive distribution including an X-Gaussian distribution.

10. The user interface device of claim 9, wherein the model fitting unit is further configured to adjust characteristics of a user interface based on the proactiveness quality and the reactiveness quality.

11. The user interface device of claim 10, wherein the model fitting unit is further configured to control a visual layout and an operational function of the user interface.

12. A user interface method based on proactive and reactive button input quantification, the user interface method comprising:
    recording a plurality of button inputs of a user and a plurality of screen outputs of a screen leading to or in response to the button inputs of the user;
    extracting an input timing for each of the button inputs of the user;
    extracting an output timing to start a visual change beyond a specific reference for each of the screen outputs;
    generating a distribution of input/output intervals through timings for the button inputs and the screen outputs of the user; and
    estimating a proactiveness quality and a reactiveness quality by adjusting the distribution of the input/output intervals to fit a proactive distribution model and a reactive distribution model,
    wherein a resolution or a frame rate of a frame image for recording the screen output is downscaled before extraction of the output timing based on an average interval for the button inputs of the user.

13. The user interface method of claim 12, wherein the recording of the button input and the screen output includes, for a specific section, recording time series input actions of the user for each input entity and recording time series output of the screen for each frame image.

14. The user interface method of claim 12, wherein the extraction of the input timing includes extracting a discrete timing of each of the button inputs of the user based on generation of an input event.

15. A non-transitory computer-readable medium having embodied thereon a program, which when executed by a computer causes the computer to execute a user interface method, the method comprising:
    recording a plurality of button inputs and a plurality of screen outputs of a screen leading to or in response to the button inputs of the user;
    extracting an input timing for each of the inputs of the user;
    extracting an output timing to start a visual change beyond a specific reference for each of the screen outputs;
    generating a distribution of input/output intervals through timings for the button inputs and the screen outputs of the user; and
    estimating a proactiveness quality and reactiveness quality by adjusting the distribution of the input/output intervals to fit a proactive distribution model and a reactive distribution model,
    wherein a resolution or a frame rate of a frame image for recording the screen output is downscaled before extraction of the output timing based on an average interval for the button input of the user.

* * * * *